(12) United States Patent
Song et al.

(10) Patent No.: US 11,398,976 B2
(45) Date of Patent: Jul. 26, 2022

(54) METHOD, DEVICE, AND SYSTEM FOR IMPLEMENTING MUX MACHINE

(71) Applicant: Huawei Technologies Co., Ltd., Shenzhen (CN)

(72) Inventors: Bo Song, Nanjing (CN); Feng Qian, Nanjing (CN); Hui Zhao, Nanjing (CN); Chong Wang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 187 days.

(21) Appl. No.: 16/727,246

(22) Filed: Dec. 26, 2019

(65) Prior Publication Data
US 2020/0136959 A1 Apr. 30, 2020

Related U.S. Application Data

(63) Continuation of application No. PCT/CN2018/075611, filed on Feb. 7, 2018.

(30) Foreign Application Priority Data

Jun. 29, 2017 (CN) .......................... 201710515167.5

(51) Int. Cl.
*H04L 12/703* (2013.01)
*H04L 12/50* (2006.01)
(Continued)

(52) U.S. Cl.
CPC .......... *H04L 45/245* (2013.01); *H04L 47/125* (2013.01); *H04L 47/41* (2013.01); *H04L 49/30* (2013.01)

(58) Field of Classification Search
CPC ....... H04L 45/245; H04L 49/30; H04L 45/28; H04L 51/00; H04L 47/125; H04L 47/41;
(Continued)

(56) References Cited

U.S. PATENT DOCUMENTS

| 9,100,329 B1* | 8/2015 | Jiang | H04L 41/0663 |
| 2011/0038267 A1* | 2/2011 | Smith | H04L 43/0811 |
| | | | 370/248 |

(Continued)

FOREIGN PATENT DOCUMENTS

| CN | 101355515 A | 1/2009 |
| CN | 101420332 A | 4/2009 |

(Continued)

OTHER PUBLICATIONS

Time Sensitive Networking Task Group of IEEE 802 1, "Draft Standard for Local and Metropolitan Area Networks—Bridges and Bridged Networks—Link Aggregation", IEEE Draft; 802.1AX-REV-D0.I, IEEE-SA, Piscataway, NJ USA, XP068113848, May 17, 2017, pp. 1-376.

(Continued)

*Primary Examiner* — Ivan O Latorre
*Assistant Examiner* — Vanneilian Lalchinthang
(74) *Attorney, Agent, or Firm* — Conley Rose, P.C.

(57) ABSTRACT

A method, a device, and a system for implementing a multiplexor (mux) machine, where the method includes setting an aggregation port of a first network device to a collecting and distributing state when a mux machine of the first aggregation port of the first network device is in a collecting distributing state, starting, by the first network device, a timer, and switching the mux machine from the collecting distributing state to an attached state when the first network device determines, when the timer expires, that no Link Aggregation Control Port data unit (LACPDU) packet that is from a second network device and that indicates that an aggregation port of the second network device is in the collecting and distributing state is received.

20 Claims, 8 Drawing Sheets

(51) Int. Cl.
*H04L 12/707* (2013.01)
*H04L 45/24* (2022.01)
*H04L 47/125* (2022.01)
*H04L 47/41* (2022.01)
*H04L 49/00* (2022.01)

(58) Field of Classification Search
CPC . H04L 49/3054; H04L 41/0663; H04L 69/28; H04L 41/0816; H04L 45/22; H04L 41/0886; H04B 1/00; Y02D 30/50
USPC ............................................ 370/329
See application file for complete search history.

(56) References Cited

U.S. PATENT DOCUMENTS

| | | | | |
|---|---|---|---|---|
| 2013/0238738 | A1* | 9/2013 | Yu | H04L 51/00 709/206 |
| 2014/0204729 | A1* | 7/2014 | Zhang | H04L 41/0672 370/218 |
| 2014/0314095 | A1* | 10/2014 | Saltsidis | H04L 47/34 370/394 |
| 2016/0134477 | A1* | 5/2016 | Guo | H04L 41/0836 370/254 |
| 2017/0063672 | A1* | 3/2017 | Ch | H04L 45/28 |
| 2017/0201323 | A1* | 7/2017 | Prakash | H04Q 11/0001 |
| 2017/0289018 | A1* | 10/2017 | Iyer | H04L 41/0823 |
| 2019/0089627 | A1* | 3/2019 | Mirsky | H04L 45/50 |

FOREIGN PATENT DOCUMENTS

| | | | |
|---|---|---|---|
| CN | 101945042 A | 1/2011 | |
| CN | 104243259 A | 12/2014 | |
| EP | 2613478 A1 * | 7/2013 | ........... H04L 45/245 |
| EP | 2613478 B1 | 8/2019 | |
| WO | WO-2015070383 A1 * | 5/2015 | ........... H04L 45/245 |

OTHER PUBLICATIONS

Interworking Task Group of IEEE 802 1, "Draft Standard for Local and Metropolitan Area Networks-Link Aggregation", IEEE P802.1AX-REV(TM.)./D4.54, XP009517939, Oct. 15, 2014, pp. 1-333.

* cited by examiner

METHOD, DEVICE, AND SYSTEM FOR IMPLEMENTING MUX MACHINE

CROSS-REFERENCE TO RELATED APPLICATIONS

This application is a continuation of International Patent Application No. PCT/CN2018/075611 filed on Feb. 7, 2018, which claims priority to Chinese Patent Application No. 201710515167.5 filed on Jun. 29, 2017. The disclosures of the aforementioned applications are hereby incorporated by reference in their entireties.

TECHNICAL FIELD

This application relates to the field of communications technologies, and in particular, to a method, a device, and a system for implementing a multiplexor (Mux) machine. Moreover, this application relates to a technology for implementing a Mux machine in a network running the Link Aggregation Control Protocol (LACP).

BACKGROUND

The LACP provides a standard negotiation manner for network devices that exchange data. When network devices at two ends are aggregated according to the LACP, an aggregated link may be automatically formed between the network devices based on their respective configurations, and the network devices receive and send data over the aggregated link. After the aggregated link is formed, the network devices at the two ends of the aggregated link are responsible for maintaining a status of the link. When an aggregation condition changes, link aggregation is automatically adjusted or dissolved.

An LACP state machine maintains information about each aggregation port and information about a peer-end aggregation port of the aggregation port on a port basis, calculates an aggregation state of each aggregation port, exchanges an LACP packet with another network device, and invokes the aggregation port to manage an aggregation group and an aggregation member. The LACP state machine includes a receive state (RX) machine, a periodic transmission machine (PTX machine), selection logic, a Mux machine, and a transmission machine (TX machine). The Mux machine is configured to attach an aggregation port to a selected aggregator or detach an aggregation port from an unselected aggregator, and enable or disable a collecting and distributing state of the aggregation port based on current protocol information.

In an actual application scenario, a network device runs a Mux machine associated with an aggregation port of the network device. When a trigger condition is met, the network device switches the Mux machine of the aggregation port of the network device from an ATTACHED state to a COLLECTING_DISTRIBUTING state. However, the network device cannot ensure that a Mux machine associated with an aggregation port of a peer-end network device of the network device is in the COLLECTING_DISTRIBUTING state. Therefore, in the actual application scenario, for an aggregated link between the network device and the peer-end network device, an aggregation port at one end may be in the collecting and distributing state, and an aggregation port at the other end may be not in the collecting and distributing state. Consequently, a packet loss occurs in service traffic.

SUMMARY

In view of this, embodiments of this application provide a method, a device, and a system for implementing a Mux machine that are applied to a network running the LACP in order to detect and process statuses of aggregation ports at two ends of an aggregated link in the Mux machine, thereby reducing a packet loss generated during service traffic transmission.

The technical solutions provided in the embodiments of this application are as follows.

According to a first aspect, a method for implementing a Mux machine is provided. The method is applied to a network running the LACP, and the network includes a first network device and a second network device. A first aggregation port of the first network device is connected to a second aggregation port of the second network device over an aggregated link. When the first network device determines that a Mux machine of the first aggregation port is in a COLLECTING_DISTRIBUTING state, the first network device sets the first aggregation port to a collecting and distributing state. Then, the first network device starts a timer, and determines, before the timer expires, whether a first LACP data unit (LACPDU) packet from the second network device is received, where the first LACPDU packet is used to indicate that the second aggregation port is in the collecting and distributing state. If the first network device determines, when the timer expires, that the first LACPDU packet from the second network device is not received, the first network device switches the Mux machine from the COLLECTING_DISTRIBUTING state to an ATTACHED state.

According to the solution provided in this embodiment, the first network device detects an LACPDU packet from the second network device by controlling the timer, and if the first network device determines, when the timer expires, that no LACPDU packet that is from the second network device and that indicates that the second aggregation port of the second network device is in the collecting and distributing state is received, the first network device switches the Mux machine from the COLLECTING_DISTRIBUTING state to the ATTACHED state.

Therefore, when a Mux machine of the second aggregation port of the second network device does not enter the COLLECTING_DISTRIBUTING state, the first network device switches the Mux machine of the first aggregation port of the first network device from the COLLECTING_DISTRIBUTING state to the ATTACHED state in a timely manner. In this implementation of this application, detection and processing of Single-port_UP of the aggregated link are implemented in the Mux machine, thereby reducing a packet loss generated during service traffic transmission.

In a possible implementation of the first aspect, the method further includes switching, by the first network device, the Mux machine from the COLLECTING_DISTRIBUTING state to a Double-port_COLLECTING_DISTRIBUTING state when the first network device determines, before the timer expires, that the first LACPDU packet from the second network device is received, where the Double-port_COLLECTING_DISTRIBUTING state is used to indicate that both the first aggregation port and the second aggregation port are in the collecting and distributing state.

According to a second aspect, a method for implementing a Mux machine is provided. The method is applied to a network running the LACP, and the network includes a first network device and a second network device. A first aggregation port of the first network device is connected to a second aggregation port of the second network device over an aggregated link. When the first network device determines that a Mux machine of the first aggregation port is in a COLLECTING_DISTRIBUTING state, the first network device sets the first aggregation port to a collecting and distributing state. Then, the first network device starts a timer, and determines, before the timer expires, whether a first LACPDU packet from the second network device is received, where the first LACPDU packet is used to indicate that the second aggregation port is in the collecting and distributing state. When the first network device determines, before the timer expires, that the first LACPDU packet is received, the first network device switches the Mux machine from the COLLECTING_DISTRIBUTING state to a Double-port_COLLECTING_DISTRIBUTING state, where the Double-port_COLLECTING_DISTRIBUTING state is used to indicate that both the first aggregation port and the second aggregation port are in the collecting and distributing state.

In the foregoing implementation, the first network device detects an LACPDU packet from the second network device by controlling the timer, and if the first network device determines, before the timer expires, that an LACPDU packet that is from the second network device and that indicates that the second aggregation port of the second network device is in the collecting and distributing state can be received, the first network device switches the Mux machine from the COLLECTING_DISTRIBUTING state to the Double-port_COLLECTING_DISTRIBUTING state. This ensures that the first network device switches the Mux machine of the aggregation port to the stable collecting and distributing state when both the aggregation ports at two ends of the aggregated link are UP. In this implementation of this application, detection and processing of Single-port_UP of the aggregated link are implemented in the Mux machine, thereby reducing a packet loss generated during service traffic transmission.

In a possible implementation of the second aspect, the method further includes switching, by the first network device, the Mux machine from the COLLECTING_DISTRIBUTING state to an ATTACHED state if the first network device determines, when the timer expires, that the first LACPDU packet from the second network device is not received.

In another possible implementation of the first aspect or the second aspect, after switching, by the first network device, the Mux machine from the COLLECTING_DISTRIBUTING state to a Double-port_COLLECTING_DISTRIBUTING state, the method further includes stopping, by the first network device, the timer.

Based on the foregoing implementation, after the Mux machine enters the Double-port_COLLECTING_DISTRIBUTING state, incorrect switching is avoided when the timer expires.

In still another possible implementation of the first aspect or the second aspect, the Mux machine of the first aggregation port is in the ATTACHED state before being in the COLLECTING_DISTRIBUTING state, and the method further includes receiving, by the first network device, a second LACPDU packet from the second network device, and switching, by the first network device, the Mux machine from the ATTACHED state to the COLLECTING_DISTRIBUTING state when the first network device determines that the first aggregation port is in a selected state, determines, based on the second LACPDU packet, that the second aggregation port is in a synchronization state, and determines, based on the second LACPDU packet, that the second aggregation port is not in the collecting and distributing state.

Based on the foregoing implementation, the first network device not only detects the synchronization state of the second aggregation port using the second LACPDU packet, but also detects the collecting and distributing state of the second aggregation port using the second LACPDU packet. This ensures that the second aggregation port is started to switch from a non-collecting and non-distributing state to a collecting and distributing state after the Mux machine enters the COLLECTING_DISTRIBUTING state.

Optionally, determining, by the first network device based on the second LACPDU packet, that the second aggregation port is in a synchronization state further includes determining, by the first network device, that first information included in the second LACPDU packet matches second information of the first aggregation port stored in the first network device, where the first information includes Partner_Port, Partner_Port_Priority, Partner_System, Partner_System_Priority, Partner_Key, and Partner_State.Aggregation, and the second information includes Actor_Port_Number, Actor_Port_Priority, Actor_System, Actor_System_Priority, Actor_Oper_Port_Key, and Actor_Oper_Port_State.Aggregation, and determining, by the first network device, that Actor_State.Synchronization included in the second LACPDU packet indicates the synchronization state.

In another possible implementation of the first aspect or the second aspect, the method further includes, when the first network device determines, based on the second LACPDU packet, that the second aggregation port is in the synchronization state, and determines, based on the second LACPDU packet, that the second aggregation port is in the collecting and distributing state, switching, by the first network device, the Mux machine from the ATTACHED state to the Double-port_COLLECTING_DISTRIBUTING state, and setting the first aggregation port to the collecting and distributing state.

Based on the foregoing implementation, when the first network device determines that the second aggregation port is in the collecting and distributing state, the Mux machine running on the first aggregation port quickly enters the dual-port collecting and distributing state, thereby effectively reducing a packet loss generated during service traffic transmission.

In another possible implementation of the first aspect or the second aspect, the method further includes receiving, by the first network device, a third LACPDU packet from the second network device, where the third LACPDU packet is used to indicate that the second aggregation port is not in the collecting and distributing state, and switching the Mux machine from the Double-port_COLLECTING_DISTRIBUTING state to the COLLECTING_DISTRIBUTING state when the first network device determines, based on the third LACPDU packet, that the second aggregation port is not in the collecting and distributing state.

Based on the foregoing implementation, after receiving the third LACPDU packet that indicates that the second aggregation port is not in the collecting and distributing state, the first network device switches the Mux machine to the COLLECTING_DISTRIBUTING state in a timely manner, thereby effectively reducing a packet loss generated during service traffic transmission.

In another possible implementation of the first aspect or the second aspect, the method further includes switching, by the first network device, the Mux machine from the Double-port_COLLECTING_DISTRIBUTING state to the ATTACHED state when at least one of the following conditions is met: the first network device determines that the first aggregation port is in an unselected state; the first network device determines that the first aggregation port is in a standby state; and the first network device receives a fourth LACPDU packet from the second network device, and determines, based on the fourth LACPDU packet, that the second aggregation port is not in the synchronization state.

In the first aspect or the second aspect, optionally, the method further includes setting, by the first network device, the aggregated link to Single-port_UP when the Mux machine is in a COLLECTING_DISTRIBUTING state and the timer expires, where Single-port_UP is used to indicate that an aggregation port at one end of the aggregated link is in the collecting and distributing state, and an aggregation port at the other end is not in the collecting and distributing state.

Based on the foregoing implementation, repeated flapping between the ATTACHED state and the COLLECTING_DISTRIBUTING state can be avoided for the Mux machine.

In the first aspect or the second aspect, optionally, in a DETACHED state, the first network device sets a value of the Single-port_UP flag bit to FALSE.

Based on the foregoing implementation, running the Mux machine is prevented from being affected by a value of an original Single-port_UP flag bit.

In the first aspect or the second aspect, optionally, duration of the timer is greater than or equal to 3 seconds (s) and less than or equal to 90 s.

According to a third aspect, a first network device is provided, and the first network device has a function of implementing behavior of the first network device in the foregoing methods. The function may be implemented by hardware, or may be implemented by hardware executing corresponding software. The hardware or software includes one or more modules corresponding to the foregoing function.

In a possible design, a structure of the first network device includes a processor and an interface. The processor is configured to support the first network device in performing a corresponding function in the foregoing methods. The interface is configured to support communication between the first network device and a second network device, and send information or an instruction in the foregoing methods to the second network device, or receive information or an instruction in the foregoing methods from the second network device. The first network device may further include a memory. The memory is configured to be coupled to the processor, and store a program instruction and data that are necessary for the first network device.

In another possible design, the first network device includes a processor, a transmitter, a random access memory (RAM), a read-only memory (ROM), and a bus. The processor is separately coupled to the transmitter, the RAM, and the ROM using the bus. When the first network device needs to run, a basic input/output system built into the ROM or a bootloader in an embedded system is used to boot the system to start, and boot the first network device to enter a normal running state. After entering the normal running state, the first network device runs an application program and an operating system in the RAM such that the processor performs the method in any one of the first aspect or the possible implementations of the first aspect, or the processor performs the method in any one of the second aspect or the possible implementations of the second aspect.

According to a fourth aspect, a first network device is provided, and the first network device includes a main control board and an interface board, and may further include a switching board. The first network device is configured to perform the method in any one of the first aspect or the possible implementations of the first aspect. Further, the first network device includes a module configured to perform the method in any one of the first aspect or the possible implementations of the first aspect, or the first network device includes a module configured to perform the method in any one of the second aspect or the possible implementations of the second aspect.

According to a fifth aspect, a first network system is provided, and the first network system includes a controller and a first forwarding device. The first forwarding device includes an interface board, and may further include a switching board. The first forwarding device is configured to execute a function of the interface board in the fourth aspect, and may further execute a function of the switching board in the fourth aspect. The controller includes a receiver, a processor, a transmitter, a RAM, a ROM, and a bus. The processor is separately coupled to the receiver, the transmitter, the RAM, and the ROM using the bus. When the controller needs to run, a basic input/output system built into the ROM or a bootloader in an embedded system is used to boot the system to start, and boot the controller to enter a normal running state. After entering the normal running state, the controller runs an application program and an operating system in the RAM such that the processor executes a function of the main control board in the fourth aspect.

According to a sixth aspect, a network system for implementing a Mux machine is provided, and the network system includes a first network device and a second network device. The first network device or the second network device or both are the first network device in the third aspect, the fourth aspect, or the fifth aspect.

According to a seventh aspect, a computer storage medium is provided. The computer storage medium is configured to store a program, code, or an instruction that are used by the foregoing first network device. When executing the program, the code, or the instruction, a processor or a hardware device may complete a function or step of the first network device in the foregoing aspects.

In the foregoing solutions, according to the method, the device, and the system for implementing a Mux machine provided in the embodiments of this application, when the Mux machine of the first aggregation port of the first network device is in the COLLECTING_DISTRIBUTING state, the first aggregation port of the first network device is set to the collecting and distributing state, and the first network device starts the timer. If the first network device determines, when the timer expires, that no LACPDU packet that is from the second network device and that indicates that the second aggregation port of the second network device is in the collecting and distributing state is received, the first network device switches the Mux machine from the COLLECTING_DISTRIBUTING state to the ATTACHED state.

Therefore, when the Mux machine of the second aggregation port of the second network device does not enter the COLLECTING_DISTRIBUTING state, the first network device switches the Mux machine of the first aggregation port of the first network device from the COLLECTING_DISTRIBUTING state to the ATTACHED state in a timely manner. In the implementations of this application, detection and processing of Single-port_UP of an aggregated link in a coupled control mode are implemented in a Mux machine, thereby reducing a packet loss generated during service traffic transmission.

DESCRIPTION OF EMBODIMENTS

The following separately provides detailed descriptions using specific embodiments.

For the LACP in this application, refer to descriptions of the Institute of Electrical and Electronics Engineers (IEEE) 802.1ax and IEEE 802.3ad. IEEE 802.1ax and IEEE 802.3ad are incorporated herein by reference in their entireties. In the embodiments of this application, TRUE indicates "true" or indicates that "a condition is met". In computer code, a value of TRUE may be "1". FALSE indicates "false" or indicates that "a condition is not met". In computer code, a value of FALSE can be "0". In the embodiments of this application, UP indicates that a port is enabled or available. That is, the port is allowed to send and receive a data packet. DOWN indicates that a port is disabled or unavailable. That is, the port is not allowed to send and receive a data packet. In the embodiments of this application, "determining" may include a "setting" implementation, or a "maintaining" implementation.

Figure 1:
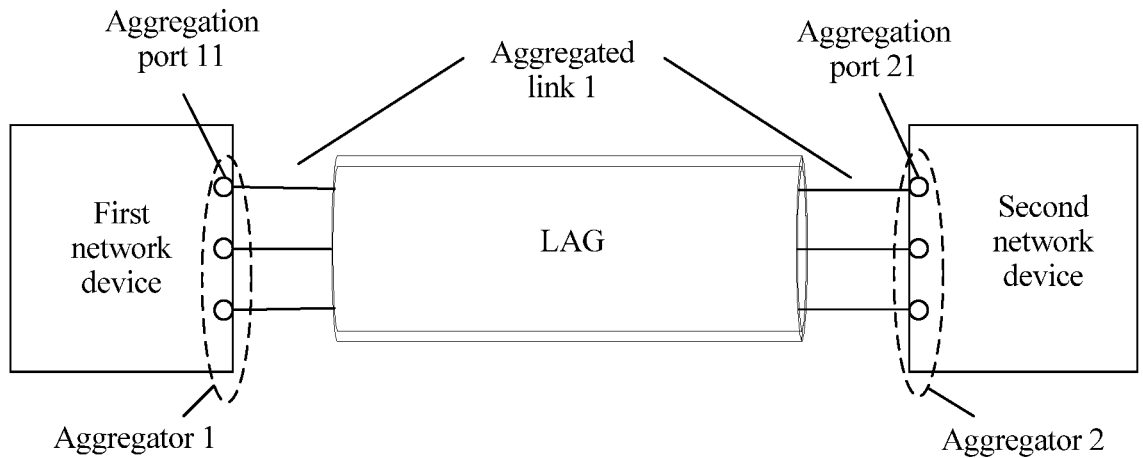
FIG. 1 is a schematic structural diagram of a network running the LACP according to an embodiment of this application.

FIG. 1 is a schematic structural diagram of a network running the LACP according to an embodiment of this application. As shown in FIG. 1, the network includes a first network device and a second network device. The first network device communicates with the second network device using a link aggregation group (LAG). The LAG includes at least one aggregated link. For example, the LAG includes an aggregated link 1, and the first network device communicates with the second network device over the aggregated link 1. One end of the aggregated link 1 is an aggregation port 11 on the first network device, and the other end of the aggregated link 1 is an aggregation port 21 on the second network device. An aggregator 1 on the first network device and an aggregator 2 on the second network device are associated with the LAG. The aggregator 1 manages the aggregation port 11, and the aggregator 2 manages the aggregation port 21.

FIG. 1 shows two network devices. It should be understood that a quantity of network devices included in the network is not limited, and there may be two or three or more network devices. For example, the network further includes a third network device, the first network device communicates with the second network device using an LAG 1, and the first network device communicates with the third network device using an LAG 2. There may be another network device between two network devices that are connected using the LAG. For example, the LAG between the first network device and the second network device includes a switch. The first network device and the second network device each may be a physical device, and the physical device includes a router or a switch. Both the first network device and the second network device may be connected to another network device. For example, the first network device is connected to a client, and the second network device is connected to a server. The client communicates with the server through the network shown in FIG. 1.

For definitions of the LAG, the aggregated link, the aggregation port, and the aggregator in this embodiment of this application, refer to descriptions in the IEEE 802.1ax. Details are not described herein. The network device may include one or more aggregators. A quantity of aggregators included in the network device may be greater than, less than, or equal to a quantity of aggregation ports included in the network device. One aggregation port on the network device may belong to different aggregators at the same time.

In FIG. 1, the first network device and the second network device separately run the LACP. Further, each aggregation port of the first network device and the second network device is associated with one LACP state machine. For example, the aggregation port 11 is associated with an LACP state machine 11, and the aggregation port 21 is associated with an LACP state machine 21. Because aggregation ports are in a one-to-one correspondence with LACP state machines, the LACP state machine may be understood as an LACP state machine implemented on each aggregation port of the first network device and the second network device. The LACP state machine includes a RX machine, a PTX machine, selection logic, a Mux machine, and a TX machine. For definitions and implementation principles of the five sub state machines included in the foregoing LACP state machine, refer to descriptions in the IEEE 802.1ax. Details are not described herein. For each aggregation port of the first network device and the second network device, the state machine is invoked to implement link aggregation and de-aggregation.

Figure 2A:
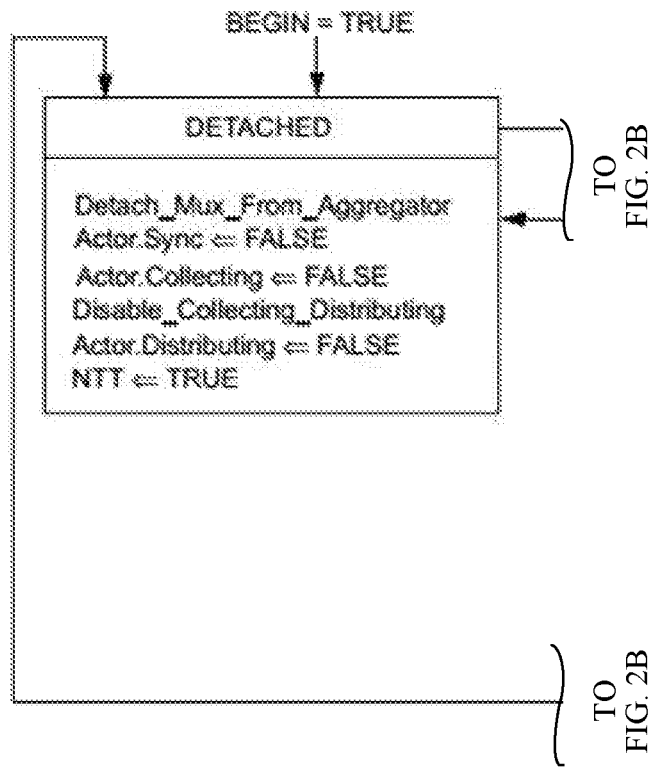
FIG. 2A and FIG. 2B are a status diagram of a Mux machine according to an embodiment of this application.
Figure 2B:
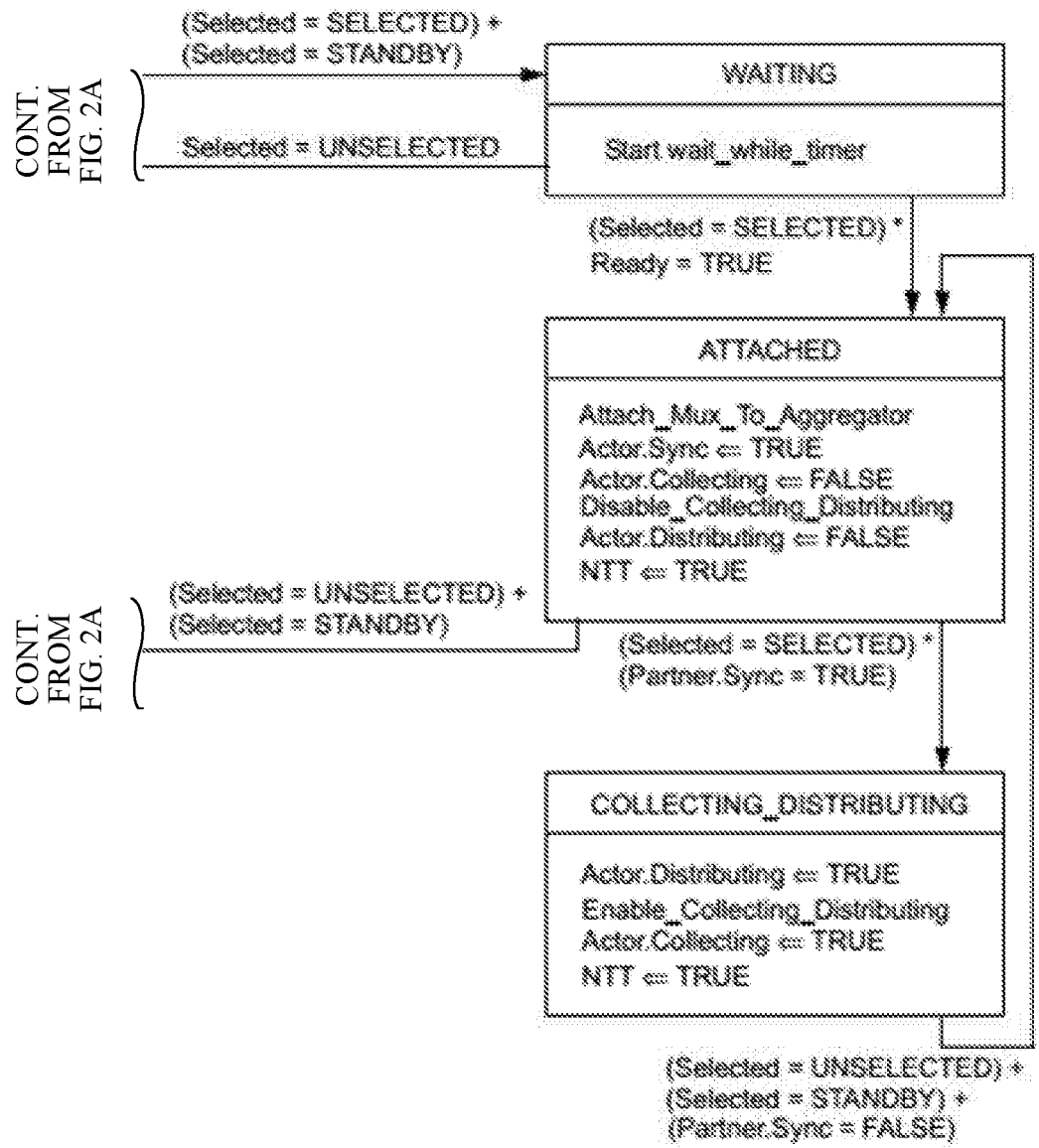

An example of implementing a Mux machine on an aggregated link 1 in FIG. 1 is used for description. One end of the aggregated link 1 is the aggregation port 11, and the other end of the aggregated link 1 is the aggregation port 21. The Mux machine is separately implemented on the aggregation port 11 and the aggregation port 21. Further, the first network device implements the Mux machine on the aggregation port 11, and the second network device implements the Mux machine on the aggregation port 21. FIG. 2A and FIG. 2B are a status diagram of a Mux machine in a coupled control mode. As shown in FIG. 2A and FIG. 2B, the Mux machine includes four states: a DETACHED state, a WAITING state, an ATTACHED state, and a COLLECTING_DISTRIBUTING state. In FIG. 2A and FIG. 2B, in the Mux machine implemented on the aggregation port 11, the first network device is considered as a local end (actor), and the second network device is considered as a peer end (partner). In the Mux machine implemented on the aggregation port 21, the second network device is considered as an actor, and the first network device is considered as a partner. In FIG. 2A and FIG. 2B, "+" represents "or", and "*" represents "and".

The first network device implements the Mux machine on the aggregation port 11, and the Mux machine enters the DETACHED state by default during initialization. When the Mux machine is in the DETACHED state, the first network device performs the following processing.

It is determined that Actor_Oper_Port_State.Synchronization (Actor.Sync) is FALSE. It indicates that the aggregation port 11 of the first network device is not in the synchronization state, or it may be considered that the aggregation port 11 is in an asynchronization state. Actor.Sync is used to indicate the synchronization state of the aggregation port 11 of the first network device.

It is determined that Actor_Oper_Port_State.Distributing (Actor.Distributing) is FALSE. It indicates that the aggregation port 11 is not in a distributing state, or it may be considered that the aggregation port 11 is in a non-distributing state. Actor.Distributing is used to indicate a distributing state of the aggregation port 11.

It is determined that Actor_Oper_Port_State.Collecting (Actor.Collecting) is FALSE. It indicates that the aggregation port 11 is not in a collecting state, or it may be considered that the aggregation port 11 is in a non-collecting state. Actor.Collecting is used to indicate a collecting state of the aggregation port 11.

It is determined that Need To Transmit (NTT) is TRUE. NTT is used to indicate whether to allow to transmit an LACPDU packet between the first network device and the second network device.

In this embodiment of this application, two fields may be used to respectively indicate a distributing state and a collecting state of a local-end operation port, for example, Actor.Collecting and Actor.Distributing described above. Alternatively, one field may be used to indicate a distributing state and a collecting state of a local-end operation port, for example, Actor.Collecting_Distributing. In a same principle, two fields may be used to respectively indicate a distributing state and a collecting state of a peer-end operation port, for example, Partner.Collecting and Partner.Distributing described above. Alternatively, one field may be used to indicate a distributing state and a collecting state of a peer-end operation port, for example, Partner.Collecting_Distributing. In this embodiment of this application, both a manner of indication using a collecting field and a distributing field and a manner of indication using a Collecting_Distributing field may be represented as a "collecting and distributing state". That is, both the manner of indication using the collecting field and the distributing field and the manner of indication using a Collecting_Distributing field are implementations of the "collecting and distributing state".

When the first network device determines that the aggregation port 11 is in a SELECTED state (as shown in FIG. 2A and FIG. 2B, Selected=SELECTED) or a STANDBY state (as shown in FIG. 2A and FIG. 2B, Selected=STANDBY), the first network device switches the Mux machine from the DETACHED state to the WAITING state. Further, the first network device may invoke the selection logic to select an aggregator associated with the aggregation port 11. According to FIG. 1, the aggregator is the aggregator 1. The SELECTED state is used to indicate that an appropriate aggregator is selected. The STANDBY state is used to indicate that an appropriate aggregator is selected and that a port associated with the aggregator does not enable an aggregation function. When the Mux machine is in the WAITING state, the first network device performs starting wait_while_timer. In the WAITING state, if the first network device receives a trigger event, the first network device determines that the aggregation port 11 is in an UNSELECTED state (as shown in FIG. 2A and FIG. 2B, Selected=UNSELECTED), and the first network device switches the Mux machine from the WAITING state to the DETACHED state. Further, the UNSELECTED state may be triggered by the selection logic, or may be triggered by the RX machine.

When the aggregation port 11 is in a SELECTED state, and that a Ready state is TRUE, the first network device switches the Mux machine from the WAITING state to the ATTACHED state. If the aggregation port 11 is in the SELECTED state when the Mux machine is in the WAITING state, when wait_while_timer expires, the first network device determines that the Ready state is TRUE. When the Ready state is TRUE, it indicates that wait_while_timer expires, and that the aggregation port 11 waits to be attached to the aggregator 1. If the aggregation port 11 is in the STANDBY state when the Mux machine is in the WAITING state, even if wait_while_timer expires, it is not determined that the Ready state is TRUE, and the WAITING state remains unchanged. In the ATTACHED state, the first network device attaches the aggregation port 11 to the aggregator 1, and performs determining that Actor.Sync is TRUE, which indicates that the aggregation port 11 of the first network device is in the synchronization state, determining that Actor.Collecting is FALSE, which indicates that the aggregation port 11 is not in the collecting state, determining that Actor.Distributing is FALSE, which indicates that the aggregation port 11 is not in the distributing state, and determining that NTT is TRUE.

If the first network device receives a trigger event, the first network device determines that the aggregation port 11 is in the UNSELECTED state or the STANDBY state, and the first network device switches the Mux machine from the ATTACHED state to the DETACHED state. After the Mux machine enters the DETACHED state, the first network device detaches the aggregation port 11 from the aggregator 1, and determines corresponding state information of the aggregation port 11 as a state indicated in the DETACHED state in FIG. 2A and FIG. 2B.

When the aggregation port 11 is in the SELECTED state, and it is determined that Partner_Oper_Port_State.Synchronization (Partner.Sync) is TRUE, the first network device switches the Mux machine from the ATTACHED state to the COLLECTING_DISTRIBUTING state. When Partner.Sync is TRUE, it indicates that the first network device determines that the aggregation port 21 of the second network device is in the synchronization state, and Partner.Sync is used to indicate the synchronization state of the aggregation port 21 determined by the first network device. Further, that Partner.Sync is determined as TRUE may be explained as follows. The first network device learns that the aggregation port 21 is in the synchronization state, and the first network device acknowledges the synchronization state of the aggregation port 21. The first network device determines a state of Partner.Sync based on an LACPDU packet received from the second network device. When the Mux machine is in the COLLECTING_DISTRIBUTING state, the first network device performs determining that Actor.Collecting is TRUE, which indicates that the aggregation port 11 is in the collecting state, determining that Actor.Distributing is TRUE, which indicates that the aggregation port 11 is in the distributing state, and determining that NTT is TRUE. In this way, after the Mux machine enters the COLLECTING_DISTRIBUTING state, the first network device sets the aggregation port 11 to UP on the basis that the aggregation port 11 is in the collecting and distributing state. Therefore, the first network device allows the aggregation port 11 to receive and send a data packet.

If the first network device receives a trigger event, it is determined that the aggregation port 11 is in the UNSELECTED state or the STANDBY state or it is determined that Partner.Sync is FALSE, and the first network device switches the Mux machine from the COLLECTING_DISTRIBUTING state to the ATTACHED state. When Partner.Sync is FALSE, it indicates that the first network device determines that the aggregation port 21 of the second network device is not in the synchronization state.

For an explanation of each state in the flowchart of the method for implementing a Mux machine shown in FIG. 2A and FIG. 2B, refer to descriptions in the IEEE 802.1ax. The Mux machine shown in FIG. 2A and FIG. 2B may be applied to each aggregation port of the first network device and the second network device. The first network device implements the Mux machine shown in FIG. 2A and FIG. 2B on the aggregation port 11. After the Mux machine enters the COLLECTING_DISTRIBUTING state, the first network device cannot ensure that the Mux machine implemented on the aggregation port 21 of the second network device is also in the COLLECTING_DISTRIBUTING state. For example, if the second network device is faulty, the Mux machine on the aggregation port 21 cannot enter the COLLECTING_DISTRIBUTING state. Consequently, the aggregation port 11 of the aggregated link 1 is in an UP state, and can receive and send a data packet, and the aggregation port 21 of the aggregated link 1 is in a DOWN state, and cannot receive or send a data packet. As a result, an aggregation port at one end of the aggregated link 1 is in the collecting and distributing state, and an aggregation port at the other end is not in the collecting and distributing state. Alternatively, it may be considered that an aggregation port at one end of the aggregated link is UP, and an aggregation port at the other end is DOWN. A data packet sent by an UP-state aggregation port on the aggregated link cannot be received by a DOWN-state aggregation port on the aggregated link, and consequently a packet loss occurs in service traffic.

In this embodiment of this application, Single-port_UP means that an aggregation port at one end of the aggregated link is in the collecting and distributing state, and an aggregation port at the other end is not in the collecting and distributing state. That is, Single-port_UP means that an aggregation port at one end of the aggregated link is UP, and an aggregation port at the other end is DOWN. The second network device may become faulty due to an implementation difference between different vendor network devices, a network device fault, a link fault, or the like.

FIG. 1 is used as an example for description. It is assumed that a first LACPDU packet sent by the first network device to the second network device is correct, and a second LACPDU packet sent by the second network device to the first network device is incorrect. For example, Actor_System or Actor_Port carried in the second LACPDU packet is incorrect. Actor_System in the second LACPDU packet is used to indicate a system identifier of the second network device, and Actor_Port is used to indicate a port number allocated by the second network device to the aggregation port. The second LACPDU packet may be incorrect due to the following causes. The second LACPDU packet is incorrect due to a fault of another network device on a link between the first network device and the second network device, the second LACPDU packet is incorrect due to a fault that occurs when the second network device delivers the second LACPDU packet from a control plane to a forwarding plane, or the second LACPDU packet is incorrect due to a fault that occurs when the first network device transmits the second LACPDU packet from a forwarding plane to a control plane. In this way, the first network device stores incorrect state information of the second network device based on actor state information in the second LACPDU packet, and a partner identified by the first network device based on the second LACPDU packet is not the second network device but an incorrect second network device. The second network device stores correct state information of the first network device based on actor state information in the first LACPDU packet, and a partner identified by the second network device based on the first LACPDU packet is the correct first network device. Based on LACP implementation, the first network device receives an LACPDU packet (the LACPDU packet may be a correct LACPDU packet, or may be another incorrect LACPDU packet different from the second LACPDU packet) from the second network device again, and switches a state of the Mux machine to the COLLECTING_DISTRIBUTING state based on partner state information in the LACPDU packet from the second network device. The second network device receives an LACPDU packet from the first network device again, and determines, based on partner state information (the information is the previously stored state information of the incorrect second network device) in the LACPDU packet from the first network device, that the Mux machine does not enter the COLLECTING_DISTRIBUTING state. Therefore, the first aggregation port of the first network device enters the stable UP state, and the second aggregation port of the second network device at the other end of the aggregated link is in the DOWN state. When Single-port_UP occurs on the aggregated link, one end of the aggregated link is able to send data while the other end cannot receive the data, and consequently a packet loss occurs in service traffic.

To resolve the foregoing problem, the Mux machine shown in FIG. 2A and FIG. 2B is improved in this embodiment of this application, and the Mux machine may be applied to a network structure shown in FIG. 1. Therefore, if the first network device determines, when a timer expires, that the Mux machine of the second aggregation port of the second network device does not enter the COLLECTING_DISTRIBUTING state, the first network device switches the Mux machine of the first aggregation port of the first network device from the COLLECTING_DISTRIBUTING state to the ATTACHED state in a timely manner.

In another implementation, in preset duration of the timer, when ensuring that both aggregation ports at two ends of the aggregated link enter the COLLECTING_DISTRIBUTING state, the first network device switches the Mux machine of the aggregation port of the first network device to the Double-port_COLLECTING_DISTRIBUTING state.

In this implementation of this application, detection and processing of Single-port_UP of the aggregated link are implemented in the Mux machine, thereby reducing a packet loss generated during service traffic transmission. For a specific Mux machine implementation, refer to descriptions of subsequent embodiments of this application.

Figure 3:
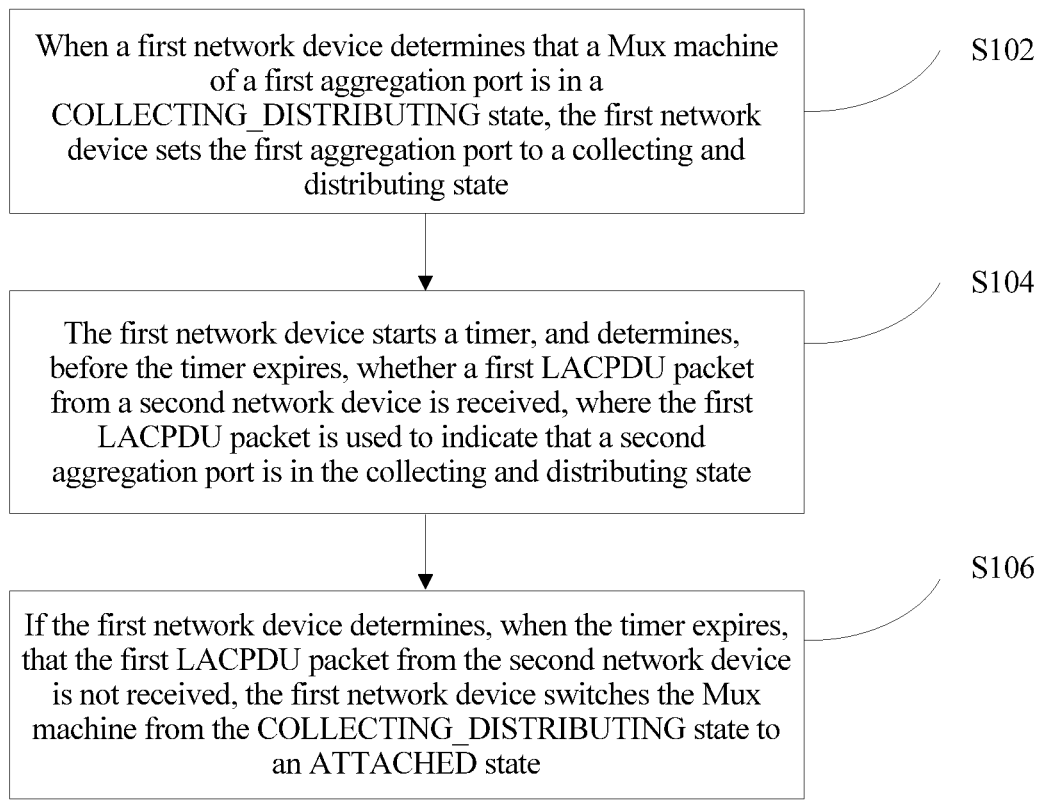
FIG. 3 is a flowchart of a method for implementing a Mux machine according to an embodiment of this application.

FIG. 3 is a flowchart of a method for implementing a Mux machine according to an embodiment of this application.

The method shown in FIG. 3 may be applied to the network running the LACP in FIG. 1. The network includes a first network device and a second network device, a first aggregation port of the first network device is connected to a second aggregation port of the second network device over an aggregated link, and the first network device implements the Mux machine on the first aggregation port.

Figure 4:
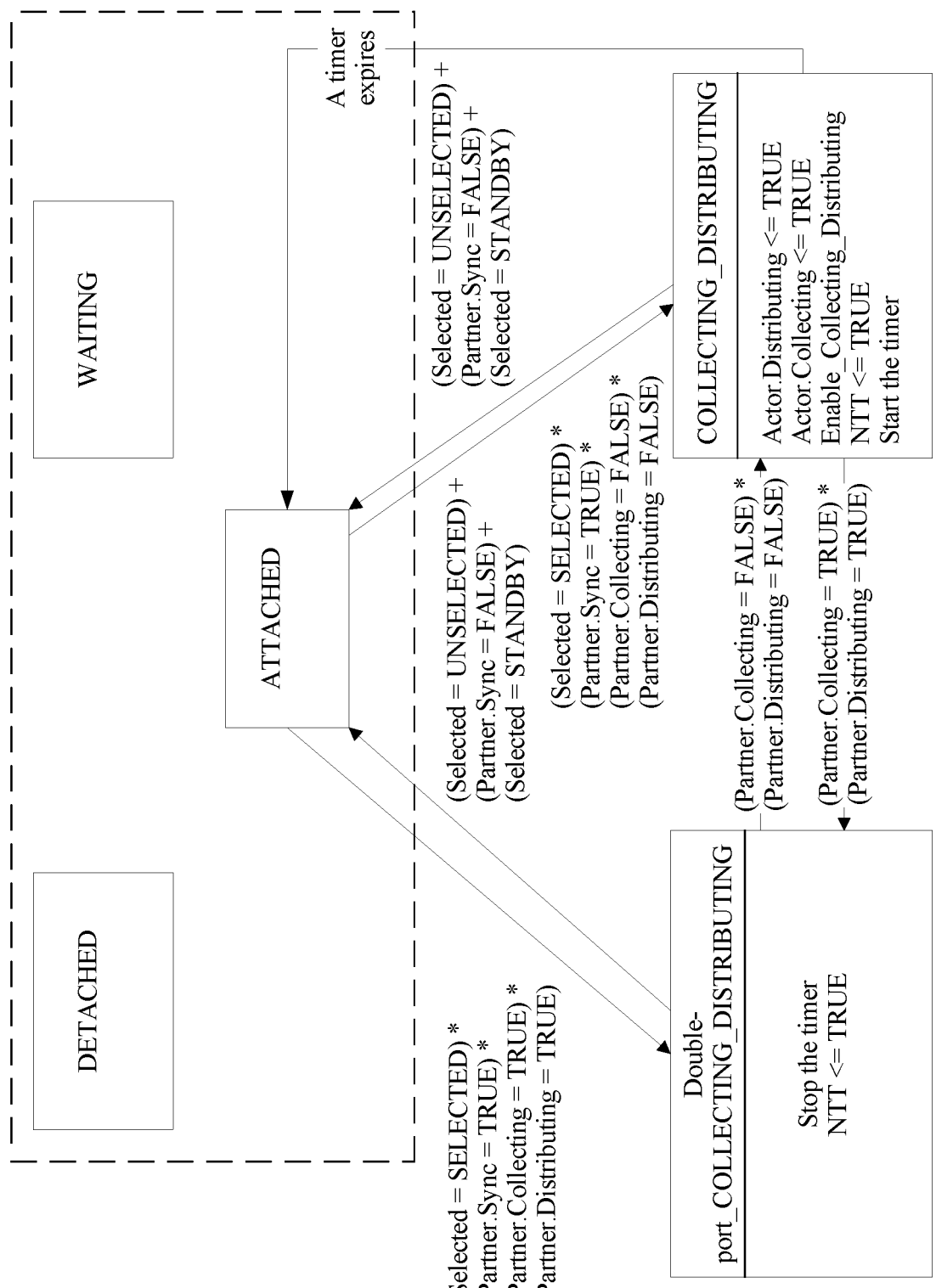
FIG. 4 is a status diagram of another Mux machine according to an embodiment of this application.

In this embodiment, the aggregated link 1 in the LAG in FIG. 1 is used as an example for description. The aggregation port 11 of the first network device is connected to the aggregation port 21 of the second network device over the aggregated link 1. It should be understood that all aggregation ports included in the first network device and all aggregation ports included in the second network device may perform the method shown in FIG. 3. FIG. 4 is a status diagram of a Mux machine according to an embodiment of this application. The method shown in FIG. 3 may be applied to the Mux machine shown in FIG. 4. FIG. 4 does not show operations performed in a DETACHED state, a WAITING state, and an ATTACHED state, and FIG. 4 does not show conditions of switching between the DETACHED state, the WAITING state, and the ATTACHED state, either. Correspondingly, for the operations performed in the DETACHED state, the WAITING state, and the ATTACHED state, and the conditions of switching between the three states in FIG. 4, refer to a corresponding part in FIG. 2A and FIG. 2B. Details are not described again in FIG. 4. For an explanation of mutual switching between the foregoing three states, refer to the descriptions in the foregoing embodiment. Details are not described herein again. In addition, explanations of an actor, a partner, "+", and "*" in FIG. 4 are the same as those in FIG. 2A and FIG. 2B, and details are not described herein again. In this embodiment of this application, the first aggregation port corresponds to the aggregation port 11 in example descriptions, and the second aggregation port corresponds to the aggregation port 21 in the example descriptions. In this embodiment, the method shown in FIG. 3 is described with reference to FIG. 1 and FIG. 4, and the method includes the following steps.

S102. When the first network device determines that a Mux machine of the first aggregation port of the first network device is in a COLLECTING_DISTRIBUTING state, the first network device sets the first aggregation port to a collecting and distributing state.

For example, the first network device implements the Mux machine on the aggregation port 11 of the first network device. When a switching condition is met, the first network device switches the Mux machine of the aggregation port 11 from the ATTACHED state to the COLLECTING_DISTRIBUTING state. In the COLLECTING_DISTRIBUTING state, the first network device performs determining that Actor.Collecting is TRUE, which indicates that the aggregation port 11 is in a collecting state, determining that Actor.Distributing is TRUE, which indicates that the aggregation port 11 is in a distributing state, and determining that NTT is TRUE. Actor.Collecting and Actor.Distributing may also be represented by Actor.Collecting_Distributing. When Actor.Collecting_Distributing is TRUE, it indicates that the aggregation port 11 is in the collecting and distributing state. In this embodiment of this application, both the foregoing representation manners are covered in a range of the "collecting and distributing state". In this way, after the Mux machine of the aggregation port 11 enters the COLLECTING_DISTRIBUTING state, the first network device sets the aggregation port 11 to UP based on the collecting and distributing state of the aggregation port 11 such that the first network device allows the aggregation port 11 to receive and send a data packet.

S104. The first network device starts a timer, and determines, before the timer expires, whether a first LACPDU packet from the second network device is received, where the first LACPDU packet is used to indicate that the second aggregation port is in the collecting and distributing state.

For example, a timer is also provided on the first network device, and the timer is associated with the aggregation port 11. The first network device detects, before the timer expires, whether the first LACPDU packet from the second network device is received. The first LACPDU packet is used to indicate that the aggregation port 21 is in the collecting and distributing state. Therefore, the first network device may determine whether an aggregation port at one end of the aggregated link 1 is in the collecting and distributing state, and an aggregation port at the other end is not in the collecting and distributing state (a non-collecting and non-distributing state). That is, the first network device may detect, based on the timer, whether Single-port_UP exists on the aggregated link 1. Further, an implementation in which the first network device detects, based on the timer, whether the aggregated link 1 is Single-port_UP is as follows. If the aggregation port 21 of the second network device is in the collecting and distributing state before the timer expires, the aggregated link 1 does not belong to Single-port_UP. If the aggregation port 21 is not in the collecting and distributing state when the timer expires, the aggregated link 1 is Single-port_UP. The timer may be implemented as a hardware timer or a software timer.

In the COLLECTING_DISTRIBUTING state, the first network device starts the timer. In addition, the aggregation port 11 is in the collecting and distributing state, and the first network device allows the aggregation port 11 to receive and send a data packet. However, the first network device still cannot determine whether the aggregation port 21 at the other end of the aggregated link 1 is in the collecting and distributing state. If the aggregation port 11 is in the collecting and distributing state, but the aggregation port 21 is not in the collecting and distributing state due to an anomaly mentioned in the foregoing embodiment, the aggregation port 21 cannot receive or send a data packet, and consequently a packet loss occurs in service traffic. Setting the timer can prevent the aggregated link 1 from being in a Single-port_UP state for a long time. If the first network device still cannot determine, after the timer expires, whether the aggregation port 21 is in the collecting and distributing state, the first network device switches the Mux machine of the aggregation port 11 back to ATTACHED such that the aggregation port 11 stops receiving and sending a data packet, thereby effectively reducing a data packet loss.

In a possible implementation, duration of the timer may be set based on an actual networking scenario and a performance requirement of a network device. For example, 3 s≤T≤90 s, where T represents the duration of the timer, and s represents a second.

In a possible implementation, the first LACPDU packet carries an Actor_State field, and a length of the Actor_State field is 1 byte. The Actor_State field includes a collecting flag bit and a distributing flag bit. The collecting flag bit and the distributing flag bit are used to indicate whether the aggregation port 21 is in the collecting and distributing state. For example, when both the collecting flag bit and the distributing flag bit are set to 1, it indicates that the aggregation port 21 is in the collecting and distributing state. For an LACPDU packet and an Actor_State format, refer to descriptions in FIG. 5 to FIG. 8 and FIG. 5 to FIG. 9 in the IEEE 802.1ax. In addition, the first network device may invoke an RX machine to receive and process the first LACPDU packet.

S106. If the first network device determines, when the timer expires, that the first LACPDU packet from the second network device is not received, the first network device switches the Mux machine from the COLLECTING_DISTRIBUTING state to the ATTACHED state.

According to the LACP, a change in state information of an aggregation port of an actor or a partner may be notified to each other using an LACPDU packet. For example, the Mux machine of the aggregation port 21 switches from the ATTACHED state to the COLLECTING_DISTRIBUTING state, and the second network device switches a collecting state of the aggregation port 21 to collecting, and switches a distributing state of the aggregation port 21 to distributing. The second network device sends the first LACPDU packet to the first network device, and the first LACPDU packet is used to indicate that the aggregation port 21 of the second network device is in the collecting and distributing state. In the Mux machine shown in FIG. 4, the first network device determines, before the timer expires, whether the first LACPDU packet is received. Therefore, the first network device may determine, based on the first LACPDU packet, whether the aggregation port 21 is in the collecting and distributing state. Based on corresponding explanations in S104, the timer is set to prevent the aggregated link 1 from being in the Single-port_UP state for a long time.

If the first network device never receives the first LACPDU packet from a moment at which the timer starts to a moment at which the timer expires, the first network device determines that the aggregated link 1 is Single-port_UP. That is, if the first network device never receives the first LACPDU packet when the timer expires, the first network device may determine that the aggregation port 21 is not in the collecting and distributing state. Based on the foregoing case, the first network device switches the Mux machine of the aggregation port 11 from the COLLECTING_DISTRIBUTING state to the ATTACHED state (as shown in FIG. 4). That the first network device never receives the first LACPDU packet when the timer expires includes the following cases. The first network device does not receive any LACPDU packet from the second network device from the moment at which the timer starts to the moment at which the timer expires, or the first network device receives an LACPDU packet from the second network device from the moment at which the timer starts to the moment at which the timer expires, but the LACPDU packet does not indicate that the aggregation port 21 is in the collecting and distributing state.

Optionally, the first network device may further set Single-port_UP. Single-port_UP is used to indicate whether the aggregated link is Single-port_UP. Single-port_UP is deployed in the Mux machine, and is triggered based on the timer. Further, in the COLLECTING_DISTRIBUTING state, if the first network device does not receive the first LACPDU packet when the timer expires, the first network device sets a value of the Single-port_UP flag bit to TRUE. That is, Single-port_UP=TRUE. That the value of the Single-port_UP flag bit is set to TRUE indicates that Single-port_UP exists on the aggregated link 1. Therefore, if the first network device does not receive the first LACPDU packet when the timer expires, the first network device switches the Mux machine of the aggregation port 11 from the COLLECTING_DISTRIBUTING state to the ATTACHED state, and the first network device sets the value of the Single-port_UP flag bit to TRUE.

After the Mux machine of the aggregation port 11 of the first network device enters the ATTACHED state, because the value of the Single-port_UP flag bit is TRUE, the first network device does not switch the Mux machine from the ATTACHED state to the COLLECTING_DISTRIBUTING state. Therefore, a further beneficial effect is that Single-port_UP can avoid repeated flapping between the ATTACHED state and the COLLECTING_DISTRIBUTING state of the Mux machine.

According to the foregoing implementation, when the Mux machine of the first aggregation port of the first network device is in the COLLECTING_DISTRIBUTING state, the first aggregation port of the first network device is set to the collecting and distributing state, and the first network device starts the timer. If the first network device determines, when the timer expires, that no LACPDU packet that is from the second network device and that indicates that the second aggregation port of the second network device is in the collecting and distributing state is received, the first network device switches the Mux machine from the COLLECTING_DISTRIBUTING state to the ATTACHED state. Therefore, when the Mux machine of the second aggregation port of the second network device does not enter the COLLECTING_DISTRIBUTING state, the first network device switches the Mux machine of the first aggregation port of the first network device from the COLLECTING_DISTRIBUTING state to the ATTACHED state in a timely manner. In this implementation of this application, detection and processing of Single-port_UP of the aggregated link are implemented in the Mux machine, thereby reducing a packet loss generated during service traffic transmission.

It should be understood that the method shown in FIG. 3 in this embodiment of this application is described using an example in which the Mux machine is implemented on the first aggregation port of the first network device. The method shown in FIG. 3 may also be applied to the second aggregation port of the second network device. In addition, for a same aggregated link, the Mux machine shown in FIG. 4 can be implemented on both aggregation ports of the aggregated link. For example, when the Mux machine shown in FIG. 4 is implemented on the aggregation port 11 shown in FIG. 1, the Mux machine shown in FIG. 4 is also implemented on the aggregation port 21. In addition, in the Mux machine of the aggregation port 11, the first network device is considered as an actor, and the second network device is considered as a partner. In the Mux machine of the aggregation port 21, the second network device is considered as an actor, and the first network device is considered as a partner.

Figure 5:
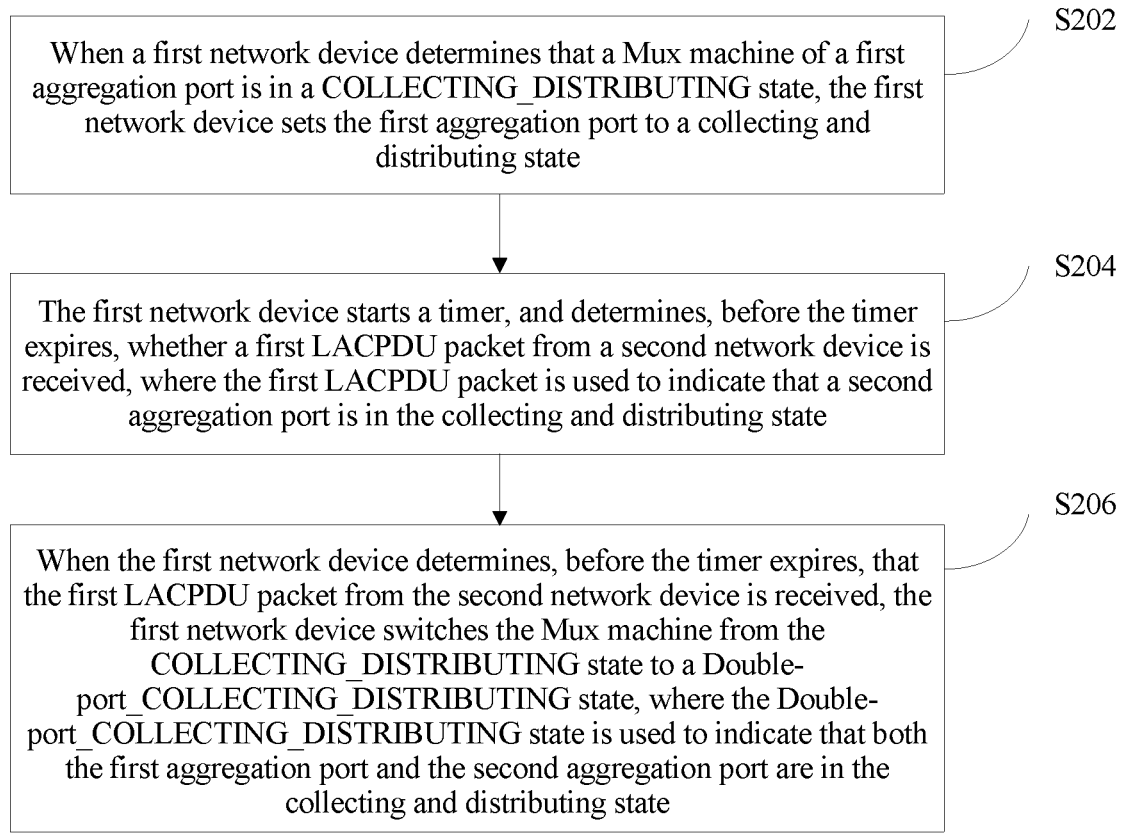
FIG. 5 is a flowchart of another method for implementing a Mux machine according to an embodiment of this application.

FIG. 5 is a flowchart of another method for implementing a Mux machine according to an embodiment of this application. The method shown in FIG. 5 may be applied to the network shown in FIG. 1. In this embodiment, the aggregated link 1 in the LAG in FIG. 1 is used as an example for description. An aggregation port 11 of a first network device is connected to an aggregation port 21 of a second network device over the aggregated link 1. It should be understood that all aggregation ports included in the first network device and all aggregation ports included in the second network device may perform the method shown in FIG. 5. FIG. 4 is a status diagram of a Mux machine according to an embodiment of this application. The method shown in FIG. 5 may be applied to the Mux machine shown in FIG. 4. In this embodiment, the method shown in FIG. 5 is described with reference to FIG. 1 and FIG. 4, and the method includes the following steps.

S202. When the first network device determines that a Mux machine of the first aggregation port of the first network device is in a COLLECTING_DISTRIBUTING state, the first network device sets the first aggregation port to a collecting and distributing state.

S204. The first network device starts a timer, and determines, before the timer expires, whether a first LACPDU packet from the second network device is received, where the first LACPDU packet is used to indicate that the second aggregation port is in the collecting and distributing state.

For implementation processes of S202 and S204, refer to corresponding descriptions of S102 and S104 in the foregoing embodiment. Details are not described herein again.

S206. When the first network device determines, before the timer expires, that the first LACPDU packet from the second network device is received, the first network device switches the Mux machine from the COLLECTING_DISTRIBUTING state to a Double-port_COLLECTING_DISTRIBUTING state, where the Double-port_COLLECTING_DISTRIBUTING state is used to indicate that both the first aggregation port and the second aggregation port are in the collecting and distributing state.

For example, if the first network device receives the first LACPDU packet before the timer expires, it indicates that for the aggregation port 21, it is determined, in a preset time period, that a collecting state is collecting and a distributing state is distributing. The first network device switches the Mux machine from the COLLECTING_DISTRIBUTING state to the Double-port_COLLECTING_DISTRIBUTING state based on the first LACPDU packet that is used to indicate that the aggregation port 21 is in the collecting and distributing state. The Double-port_COLLECTING_DISTRIBUTING state indicates that both the aggregation port 11 and the aggregation port 21 of the aggregated link 1 are in the collecting and distributing state. Further, the first network device determines, on the basis that a collecting flag bit in an Actor_State field carried in the first LACPDU packet is TRUE, that a value of Partner_Oper_Port_State.Collecting (Partner.Collecting) is TRUE. The first network device determines, on the basis that a distributing flag bit in the Actor_State field carried in the first LACPDU packet is TRUE, that a value of Partner_Oper_Port_State.Distributing (Partner.Distributing) is TRUE. The first network device switches the Mux machine from the COLLECTING_DISTRIBUTING state to the Double-port_COLLECTING_DISTRIBUTING state based on "Partner.Collecting=TRUE" and "Partner.Distributing=TRUE".

When the Mux machine of the aggregation port 11 is in the Double-port_COLLECTING_DISTRIBUTING state, both the aggregation port 11 and the aggregation port 21 of the aggregated link 1 are UP. That is, the first network device allows the aggregation port 11 to receive and send a data packet, and the second network device allows the aggregation port 21 to receive and send a data packet.

For the Mux machine shown in FIG. 4, the COLLECTING_DISTRIBUTING state is not used as a final state of the entire Mux machine (compared with FIG. 2A and FIG. 2B). A Double-port_COLLECTING_DISTRIBUTING state is added to ensure that the Mux machine of the aggregation port is switched to the stable collecting and distributing state when both the aggregation ports at two ends of the aggregated link are UP.

Optionally, in the Double-port_COLLECTING_DISTRIBUTING state, When both the aggregation port 11 and the aggregation port 21 are in the collecting and distributing state, the first network device stops the timer. A beneficial effect is as follows. After the Mux machine enters the Double-port_COLLECTING_DISTRIBUTING state, incorrect switching is avoided when the timer expires.

According to the foregoing implementation, when the Mux machine of the first aggregation port of the first network device is in the COLLECTING_DISTRIBUTING state, the first aggregation port of the first network device is set to the collecting and distributing state, and the first network device starts the timer. If the first network device determines, before the timer expires, that an LACPDU packet that is from the second network device and that indicates that the second aggregation port of the second network device is in the collecting and distributing state can be received, the first network device switches the Mux machine from the COLLECTING_DISTRIBUTING state to the Double-port_COLLECTING_DISTRIBUTING state. This ensures that the first network device switches the Mux machine of the aggregation port to the stable collecting and distributing state when both the aggregation ports at two ends of the aggregated link are UP. In this implementation of this application, detection and processing of Single-port_UP of the aggregated link are implemented in the Mux machine, thereby reducing a packet loss generated during service traffic transmission.

It should be understood that the method shown in FIG. 5 in this embodiment of this application is described using an example in which the Mux machine is implemented on the first aggregation port of the first network device. The method shown in FIG. 5 may also be applied to the second aggregation port of the second network device. In addition, for a same aggregated link, the Mux machine shown in FIG. 4 can be implemented on both aggregation ports of the aggregated link.

In a possible implementation, S206 may be applied to the method shown in FIG. 3 as an optional implementation. In another possible implementation, S106 may be applied to the method shown in FIG. 5 as an optional implementation.

The following further describes an optional implementation with reference to the implementations in FIG. 3 and FIG. 5. It should be understood that the optional implementation described below may be applied to the method in FIG. 3 or FIG. 5 as a possible implementation.

Optionally, when the Mux machine is in a DETACHED state, the first network device sets a value of the Single-port_UP flag bit to FALSE.

The DETACHED state may be considered as an initialization stage of the Mux machine. In the DETACHED state, the first network device sets the value of the Single-port_UP flag bit to FALSE (Single-port_UP=FALSE), which indicates that the aggregated link 1 is not in a Single-port_UP state. In this embodiment of this application, that the aggregated link 1 is not in a Single-port_UP state may include two cases. Both the aggregation port 11 and the aggregation port 21 of the aggregated link 1 are DOWN, or both the aggregation port 11 and the aggregation port 21 of the aggregated link 1 are UP. In the DETACHED state, the value of the Single-port_UP flag bit is set to FALSE, thereby preventing running the Mux machine from being affected by an original value of the Single-port_UP flag bit.

For example, based on the descriptions of the foregoing implementation, if the first network device determines, when the timer expires, that the first LACPDU packet is not received, the first network device switches the Mux machine from the COLLECTING_DISTRIBUTING state to the ATTACHED state. If Single-port_UP is configured in the Mux machine, the value of the Single-port_UP flag bit is set to TRUE. In this way, after the Mux machine enters the ATTACHED state, the value of the Single-port_UP flag bit remains TRUE. In this case, if the Mux machine meets a condition of switching from the ATTACHED state to the DETACHED state (referring to FIG. 2A and FIG. 2B), the Mux machine may be switched to the DETACHED state. If the value of the Single-port_UP flag bit remains unchanged, the value of the Single-port_UP flag bit remains TRUE. When the Mux machine meets a condition of switching from the DETACHED state to the ATTACHED state (referring to FIG. 2A and FIG. 2B), the Mux machine may be switched to the ATTACHED state. In this case, the value of the Single-port_UP flag bit remains TRUE. When a switching condition shown in FIG. 3 is met, the first network device switches the Mux machine from the ATTACHED state to the COLLECTING_DISTRIBUTING state again. Because Single-port_UP=TRUE, the Mux machine is quickly switched back to the ATTACHED state from the COLLECTING_DISTRIBUTING state. Therefore, in the DETACHED state, the value of the Single-port_UP flag bit is set to FALSE, thereby preventing running the Mux machine from being affected by an original value of the Single-port_UP flag bit.

Optionally, as shown in FIG. 4, before S102 or S202, the Mux machine of the first aggregation port is in the ATTACHED state, and the method further includes S1001 and S1002 such that the first network device switches the Mux machine from the ATTACHED state to the COLLECTING_DISTRIBUTING state.

S1001. The first network device receives a second LACPDU packet from the second network device.

S1002. When the first network device determines that the first aggregation port is in a selected state, determines, based on the second LACPDU packet, that the second aggregation port is in a synchronization state, and determines, based on the second LACPDU packet, that the second aggregation port is not in the collecting and distributing state, the first network device switches the Mux machine from the ATTACHED state to the COLLECTING_DISTRIBUTING state.

For example, the first network device may invoke selection logic to select an aggregator associated with the aggregation port 11. According to FIG. 1, the aggregator is the aggregator 1. SELECTED is used to indicate that an appropriate aggregator is selected. After the selection logic selects the aggregator associated with the aggregation port 11, the first network device may determine that the aggregation port 11 is in the selected state (Selected=SELECTED).

The first network device determines, based on the second LACPDU packet, whether the aggregation port 21 is in the synchronization state, and determines, based on the second LACPDU packet, whether the aggregation port 21 is in the collecting and distributing state. When the first aggregation port 11 is in the selected state, and the first network device determines, based on the second LACPDU packet, that the aggregation port 21 is in the synchronization state, and determines, based on the second LACPDU packet, that the aggregation port 21 is not in the collecting and distributing state, the first network device switches the Mux machine of the aggregation port 11 from the ATTACHED state to the COLLECTING_DISTRIBUTING state.

State information used to indicate the aggregation port 21 in the second LACPDU packet includes Actor_State, and Actor_State includes a collecting flag bit and a distributing flag bit. The first network device determines whether the collecting flag bit and the distributing flag bit that are included in Actor_State in the second LACPDU packet are set to TRUE. When the collecting flag bit and the distributing flag bit are set to FALSE, the first network device determines that the aggregation port 21 is not in the collecting and distributing state.

Optionally, before the first network device switches the Mux machine from the ATTACHED state to the COLLECTING_DISTRIBUTING state, the first network device further determines that the value of the Single-port_UP flag bit is FALSE. In a possible implementation, according to the foregoing embodiment, if the first network device does not receive the first LACPDU packet when the timer expires, the Mux machine is switched from the COLLECTING_DISTRIBUTING state to the ATTACHED state, and the value of the Single-port_UP flag bit is set to TRUE. Then, the Mux machine stays in the ATTACHED state, and the first network device triggers an alarm to instruct a network manager to troubleshoot a fault. After a fault is cleared, the value of the Single-port_UP flag bit is reset to FALSE, to ensure that the Mux machine meets the condition of switching from the ATTACHED state to the COLLECTING_DISTRIBUTING state.

In the foregoing implementations of S1001 and S1002, the Mux machine of the aggregation port 11 is in the ATTACHED state, and when the first network device determines that the aggregation port 21 is in the synchronization state and the aggregation port 21 is not in the collecting and distributing state, the first network device switches the Mux machine of the aggregation port 11 to the COLLECTING_DISTRIBUTING state. This ensures that the second aggregation port is started to switch from a non-collecting and non-distributing state to a collecting and distributing state after the Mux machine enters the COLLECTING_DISTRIBUTING state.

In S1002, optionally, the method further includes S10021 and S10022. S10021 and S10022 describe implementations in which the first network device determines, based on the second LACPDU packet, that the second aggregation port is in the synchronization state.

S10021. The first network device determines that first information included in the second LACPDU packet matches second information of the first aggregation port stored in the first network device, where the first information includes Partner_Port, Partner_Port_Priority, Partner_System, Partner_System_Priority, Partner_Key, and Partner_State.Aggregation, and the second information includes Actor_Port_Number, Actor_Port_Priority, Actor_System, Actor_System_Priority, Actor_Oper_Port_Key, and Actor_Oper_Port_State.Aggregation.

S10022. The first network device determines that Actor_State.Synchronization included in the second LACPDU packet indicates the synchronization state.

The first network device determines, based on the second LACPDU packet, whether the aggregation port 21 is in the synchronization state. Further, the first information in the second LACPDU packet includes Partner_Port, Partner_Port_Priority, Partner_System, Partner_System_Priority, Partner_Key, and Partner_State.Aggregation. The first network device determines whether the foregoing information matches the second information stored in the first network device, that is, whether the foregoing information matches local-end operation parameter values (corresponding operational parameter values for the Actor). The local-end operation parameter values stored in the first network device include Actor_Port_Number, Actor_Port_Priority, Actor_System, Actor_System_Priority, Actor_Oper_Port_Key, and Actor_Oper_Port_State.Aggregation. In addition, the state information used to indicate the aggregation port 21 in the second LACPDU packet includes Actor_State.Synchronization, and Actor_State.Synchronization is a synchronization flag bit of an Actor_State field in the second LACPDU packet. The first network device determines whether Actor_State.Synchronization in the second LACPDU packet is set to TRUE. For definitions of the foregoing information, refer to descriptions in the IEEE 802.1ax. Details are not described herein.

Optionally, information used to determine the synchronization state of the aggregation port 21 and information used to determine the collecting and distributing state of the aggregation port 21 may be carried in different second LACPDU packets. For example, the information used to determine the synchronization state of the aggregation port 21 is carried in one second LACPDU packet, and the information used to determine the collecting and distributing state of the aggregation port 21 is carried in another second LACPDU packet. The two second LACPDU packets are separately sent by the second network device to the first network device.

The first network device determines that Partner_Port, Partner_Port_Priority, Partner_System, Partner_System_Priority, Partner_Key, and Partner_State.Aggregation that are included in the second LACPDU packet match Actor_Port_Number, Actor_Port_Priority, Actor_System, Actor_System_Priority, Actor_Oper_Port_Key, and Actor_Oper_Port_State.Aggregation that are stored in the first network device. In addition, the first network device determines that Actor_State.Synchronization included in the second LACPDU packet is TRUE, and the first network device determines that the aggregation port 21 is in the synchronization state. That is, the first network device determines that Partner.Sync is TRUE. Further, that Partner.Sync is determined as TRUE may be explained as follows The first network device learns that the aggregation port 21 of the second network device is in the synchronization state (based on "Actor_State.Synchronization=TRUE"), and the first network device acknowledges that the aggregation port 21 of the second network device is in the synchronization state (based on the foregoing matching result).

Optionally, as shown in FIG. 4, the method further includes S1003 such that the first network device switches, based on the second LACPDU packet in S1001, the Mux machine of the first aggregation port from the ATTACHED state to the Double-port_COLLECTING_DISTRIBUTING state.

S1003. When the first network device determines, based on the second LACPDU packet, that the second aggregation port is in the synchronization state, and determines, based on the second LACPDU packet, that the second aggregation port is in the collecting and distributing state, the first network device switches the Mux machine from the ATTACHED state to the Double-port_COLLECTING_DISTRIBUTING state, and sets the first aggregation port to the collecting and distributing state.

For example, according to S1001, after receiving the second LACPDU packet, the first network device determines that Partner_Port, Partner_Port_Priority, Partner_System, Partner_System_Priority, Partner_Key, and Partner_State.Aggregation that are included in the second LACPDU packet match Actor_Port_Number, Actor_Port_Priority, Actor_System, Actor_System_Priority, Actor_Oper_Port_Key, and Actor_Oper_Port_State.Aggregation that are stored in the first network device. In addition, the first network device determines that Actor_State.Synchronization included in the second LACPDU packet is TRUE, and the first network device determines that the aggregation port 21 is in the synchronization state. The first network device further determines that the collecting flag bit and the distributing flag bit that are included in Actor_State in the second LACPDU packet are TRUE such that the first network device determines that the aggregation port 21 is in the collecting and distributing state. Therefore, the first network device may switch the Mux machine from the ATTACHED state to the Double-port_COLLECTING_DISTRIBUTING state based on the foregoing determining result.

S1003 describes that the first network device has determined, when the Mux machine is in the ATTACHED state, that the aggregation port 21 is in the collecting and distributing state, or it may be considered that the aggregation port 21 is UP. Therefore, the Mux machine running on the aggregation port 11 no longer enters the COLLECTING_DISTRIBUTING state, and instead, the Mux machine is directly switched from an ATTACHED state to the Double-port_COLLECTING_DISTRIBUTING state. After entering the Double-port_COLLECTING_DISTRIBUTING state, the first network device sets the aggregation port 11 to the collecting and distributing state. That is, it is determined that Actor.Collecting and Actor.Distributing are TRUE, which indicates that the aggregation port 11 is in the collecting and distributing state. The aggregation port 11 is set to UP, and the aggregated link 1 enters a stable forwarding state.

In S1003, optionally, the first network device sets the value of the Single-port_UP flag bit to FALSE in order to prevent a misoperation that may be performed by the Mux machine due to old information "Single-port_UP=TRUE".

In the foregoing implementation of S1003, the Mux machine of the aggregation port 11 is in the ATTACHED state, and when the first network device determines that the aggregation port 21 is in the synchronization state and the aggregation port 21 is in the collecting and distributing state, the first network device switches the Mux machine running on the aggregation port 11 to the Double-port_COLLECTING_DISTRIBUTING state. Based on the foregoing implementation, when the first network device determines that the second aggregation port is in the collecting and distributing state, the Mux machine running on the aggregation port 11 quickly enters the dual-port collecting and distributing state, thereby reducing a packet loss generated during service traffic transmission.

Optionally, as shown in FIG. 4, the method further includes S1101 and S1102 such that the first network device switches the Mux machine of the first aggregation port from the Double-port_COLLECTING_DISTRIBUTING state to the COLLECTING_DISTRIBUTING state.

S1101. The first network device receives a third LACPDU packet from the second network device, where the third LACPDU packet is used to indicate that the second aggregation port is not in the collecting and distributing state.

S1102. When the first network device determines, based on the third LACPDU packet, that the second aggregation port is not in the collecting and distributing state, the first network device switches the Mux machine from the Double-port_COLLECTING_DISTRIBUTING state to the COLLECTING_DISTRIBUTING state.

Based on descriptions in the foregoing embodiment, when the Mux machine of the aggregation port 11 is in the Double-port_COLLECTING_DISTRIBUTING state, both the aggregation port 11 and the aggregation port 21 are in the collecting and distributing state, both ends of the aggregated link 1 are UP, and the first network device and the second network device forward a data packet to each other over the aggregated link 1.

According to the LACP, a change in state information of an aggregation port of an actor or a partner may be notified to each other using an LACPDU packet. It is assumed that the second network device is faulty, and consequently a collecting state of the aggregation port 21 is switched from collecting to non-collecting and a distributing state of the aggregation port 21 is switched from distributing to non-distributing. The second network device sends the third LACPDU packet to the first network device, where Actor_State in the third LACPDU packet includes a collecting flag bit and a distributing flag bit. When the collecting flag bit is FALSE, it indicates that the aggregation port 21 is not in the collecting state. When the distributing flag bit is FALSE, it indicates that the aggregation port 21 is not in the distributing state. The first network device determines, on the basis that the collecting flag bit in the Actor_State field carried in the third LACPDU packet is FALSE, that a value of Partner.Collecting is FALSE. The first network device determines, on the basis that the distributing flag bit in the Actor_State field carried in the third LACPDU packet is FALSE, that a value of Partner.Distributing is FALSE. The first network device switches the Mux machine from the Double-port_COLLECTING_DISTRIBUTING state to the COLLECTING_DISTRIBUTING state based on "Partner.Collecting=FALSE" and "Partner.Distributing=FALSE".

In the foregoing implementations of S1101 and S1102, the Mux machine of the aggregation port 11 is in the Double-port_COLLECTING_DISTRIBUTING state, and when the first network device determines that the aggregation port 21 is not in the collecting and distributing state, the first network device switches the Mux machine of the aggregation port 11 from the Double-port_COLLECTING_DISTRIBUTING state to the COLLECTING_DISTRIBUTING state. Based on the foregoing implementation, after receiving the third LACPDU packet that indicates that the second aggregation port is not in the collecting and distributing state, the first network device switches the Mux machine to the COLLECTING_DISTRIBUTING state in a timely manner, thereby reducing a packet loss generated during service traffic transmission.

Optionally, as shown in FIG. 4, the method further includes S1201 such that the first network device switches the Mux machine of the first aggregation port from the Double-port_COLLECTING_DISTRIBUTING state to the ATTACHED state.

S1201. The first network device switches the Mux machine of the first aggregation port from the Double-port_COLLECTING_DISTRIBUTING state to the ATTACHED state when at least one of the following conditions is met: the first network device determines that the first aggregation port is in the unselected state; the first network device determines that the first aggregation port is in the standby state; and the first network device receives a fourth LACPDU packet from the second network device, and determines, based on the fourth LACPDU packet, that the second aggregation port is not in the synchronization state.

For example, when the Mux machine of the aggregation port 11 is in the Double-port_COLLECTING_DISTRIBUTING state, a state of the aggregation port 11 may change. For example, the aggregator 1 is not selected for the aggregation port 11, and the first network device switches the aggregation port 11 from the selected state to UNSELECTED. For another example, the aggregator 1 is selected for the aggregation port 11 but an aggregation function is disabled on the aggregation port 11, and the first network device switches the aggregation port 11 from the selected state to STANDBY. The first network device switches the Mux machine of the aggregation port 11 from the Double-port_COLLECTING_DISTRIBUTING state to the ATTACHED state depending on whether the aggregation port 11 is in the UNSELECTED state or the STANDBY state. The UNSELECTED state may be triggered by the selection logic, or may be triggered by an RX machine. The STANDBY state may be triggered by the selection logic.

When the Mux machine running on the aggregation port 11 is in the Double-port_COLLECTING_DISTRIBUTING state, the first network device may further receive the fourth LACPDU packet from the second network device. The first network device determines, based on the fourth LACPDU packet, whether the aggregation port 21 is in the synchronization state. The first network device determines, based on the fourth LACPDU packet, that the aggregation port 21 is not in the synchronization state. For an implementation in which the first network device determines, based on the fourth LACPDU packet, that the aggregation port 21 is not in the synchronization state, refer to corresponding descriptions of S10021 and S10022. Details are not described herein again. The first network device switches the Mux machine of the aggregation port 11 from the Double-port_COLLECTING_DISTRIBUTING state to the ATTACHED state on the basis that the aggregation port 21 is not in the synchronization state.

Optionally, as shown in FIG. 4, the method further includes S1301 such that the first network device switches the Mux machine from the COLLECTING_DISTRIBUTING state to the ATTACHED state.

S1301. The first network device switches the Mux machine of the first aggregation port from the COLLECTING_DISTRIBUTING state to the ATTACHED state when at least one of the following conditions is met: the first network device determines that the first aggregation port is in the unselected state; the first network device determines that the first aggregation port is in the standby state; and the first network device receives a fourth LACPDU packet from the second network device, and determines, based on the fourth LACPDU packet, that the second aggregation port is not in the synchronization state.

For an implementation in which the first network device switches the Mux machine of the aggregation port 11 from the COLLECTING_DISTRIBUTING state to the ATTACHED state based on a trigger condition, refer to corresponding descriptions of S1201. Details are not described herein again.

Optionally, after S1301, the method further includes the following step.

S1302. The Mux machine is in the ATTACHED state, and the first network device stops the timer.

In the COLLECTING_DISTRIBUTING state, the first network device starts the timer. After the first network device switches the Mux machine from the COLLECTING_DISTRIBUTING state to the ATTACHED state based on the foregoing trigger condition, the timer still counts. In the ATTACHED state, the first network device stops the timer to prevent "Single-port_UP=TRUE" caused by expiration of the timer.

Figure 6:
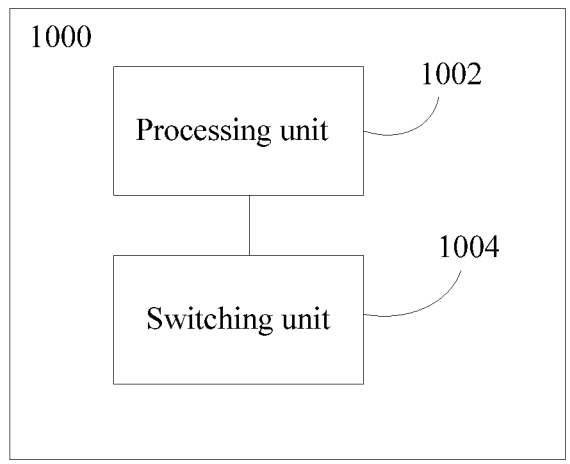
FIG. 6 is a schematic structural diagram of a first network device according to an embodiment of this application.

FIG. 6 is a schematic structural diagram of a first network device 1000 according to an embodiment of this application. The first network device 1000 shown in FIG. 6 may perform a corresponding step performed by the first network device in the method of the foregoing embodiment. The first network device 1000 runs the LACP, and a first aggregation port of the first network device 1000 is connected to a second aggregation port of the second network device over an aggregated link. As shown in FIG. 6, the first network device 1000 includes a processing unit 1002 and a switching unit 1004.

The processing unit 1002 is configured to set the first aggregation port to a collecting and distributing state when a Mux machine of the first aggregation port is in a COLLECTING_DISTRIBUTING state.

The processing unit 1002 is further configured to start a timer, and determine, before the timer expires, whether a first LACPDU packet from the second network device is received, where the first LACPDU packet is used to indicate that the second aggregation port is in the collecting and distributing state.

If the processing unit 1002 determines, when the timer expires, that the first LACPDU packet from the second network device is not received, the switching unit 1004 is configured to switch the Mux machine from the COLLECTING_DISTRIBUTING state to an ATTACHED state.

In another implementation, the processing unit 1002 and the switching unit 1004 included in the first network device 1000 may be further configured to implement the foregoing method in FIG. 5. A specific implementation is similar to the foregoing implementation in the foregoing embodiment, and details are not described herein again.

Optionally, when the processing unit 1002 determines, before the timer expires, that the first LACPDU packet from the second network device is received, the switching unit 1004 is further configured to switch the Mux machine from the COLLECTING_DISTRIBUTING state to a Double-port_COLLECTING_DISTRIBUTING state, where the Double-port_COLLECTING_DISTRIBUTING state is used to indicate that both the first aggregation port and the second aggregation port are in the collecting and distributing state.

Optionally, the processing unit 1002 is further configured to stop the timer after the switching unit 1004 switches the Mux machine from the COLLECTING_DISTRIBUTING state to the Double-port_COLLECTING_DISTRIBUTING state.

Optionally, the Mux machine of the first aggregation port is in the ATTACHED state before being in the COLLECTING_DISTRIBUTING state, and the first network device 1000 further includes a receiving unit. The receiving unit is configured to receive a second LACPDU packet from the second network device. When the processing unit 1002 determines that the first aggregation port is in a selected state, determines, based on the second LACPDU packet, that the second aggregation port is in a synchronization state, and determines, based on the second LACPDU packet, that the second aggregation port is not in the collecting and distributing state, the switching unit 1004 is further configured to switch the Mux machine from the ATTACHED state to the COLLECTING_DISTRIBUTING state.

Optionally, that the processing unit 1002 determines, based on the second LACPDU packet, that the second aggregation port is in a synchronization state further includes the processing unit 1002 is further configured to determine that first information included in the second LACPDU packet matches second information of the first aggregation port stored in the first network device 1000, where the first information includes Partner_Port, Partner_Port_Priority, Partner_System, Partner_System_Priority, Partner_Key, and Partner_State.Aggregation, and the second information includes Actor_Port_Number, Actor_Port_Priority, Actor_System, Actor_System_Priority, Actor_Oper_Port_Key, and Actor_Oper_Port_State.Aggregation. The processing unit 1002 is further configured to determine that Actor_State.Synchronization included in the second LACPDU packet indicates the synchronization state.

Optionally, when the processing unit 1002 determines, based on the second LACPDU packet, that the second aggregation port is in the synchronization state, and determines, based on the second LACPDU packet, that the second aggregation port is in the collecting and distributing state, the switching unit 1004 switches the Mux machine from the ATTACHED state to the Double-port_COLLECTING_DISTRIBUTING state, and the processing unit 1002 is further configured to set the first aggregation port to the collecting and distributing state.

Optionally, the receiving unit is further configured to receive a third LACPDU packet from the second network device, where the third LACPDU packet is used to indicate that the second aggregation port is not in the collecting and distributing state, and when the processing unit 1002 determines, based on the third LACPDU packet, that the second aggregation port is not in the collecting and distributing state, the switching unit 1004 is further configured to switch the Mux machine from the Double-port_COLLECTING_DISTRIBUTING state to the COLLECTING_DISTRIBUTING state.

Optionally, the switching unit 1004 is further configured to switch the Mux machine from the Double-port_COLLECTING_DISTRIBUTING state to the ATTACHED state when the processing unit 1002 determines that at least one of the following conditions is met: the processing unit 1002 is further configured to determine that the first aggregation port is in an unselected state; the processing unit 1002 is further configured to determine that the first aggregation port is in a standby state; and the processing unit 1002 is further configured to determine, based on a fourth LACPDU packet received from the second network device, that the second aggregation port is not in the synchronization state.

Optionally, if the processing unit 1002 determines, when the timer expires, that the first LACPDU packet from the second network device is not received, the switching unit 1004 is configured to switch the Mux machine from the COLLECTING_DISTRIBUTING state to the ATTACHED state, and the processing unit 1002 is further configured to set a value of a Single-port_UP flag bit to TRUE. When the value of the Single-port_UP flag bit is TRUE, it indicates that an aggregation port at one end of the aggregated link is in the collecting and distributing state, and an aggregation port at the other end is not in the collecting and distributing state.

Optionally, duration of the timer is greater than or equal to 3 s and less than or equal to 90 s.

The first network device shown in FIG. 6 may perform the corresponding step performed by the first network device in the method of the foregoing embodiment. The first network device is applied to a network running the LACP in order to detect and process statuses, of aggregation ports at two ends of the aggregated link, in the Mux machine, thereby reducing a packet loss generated during service traffic transmission. It should be understood that the structure in FIG. 6 is also applicable to the second network device in FIG. 1.

Figure 7:
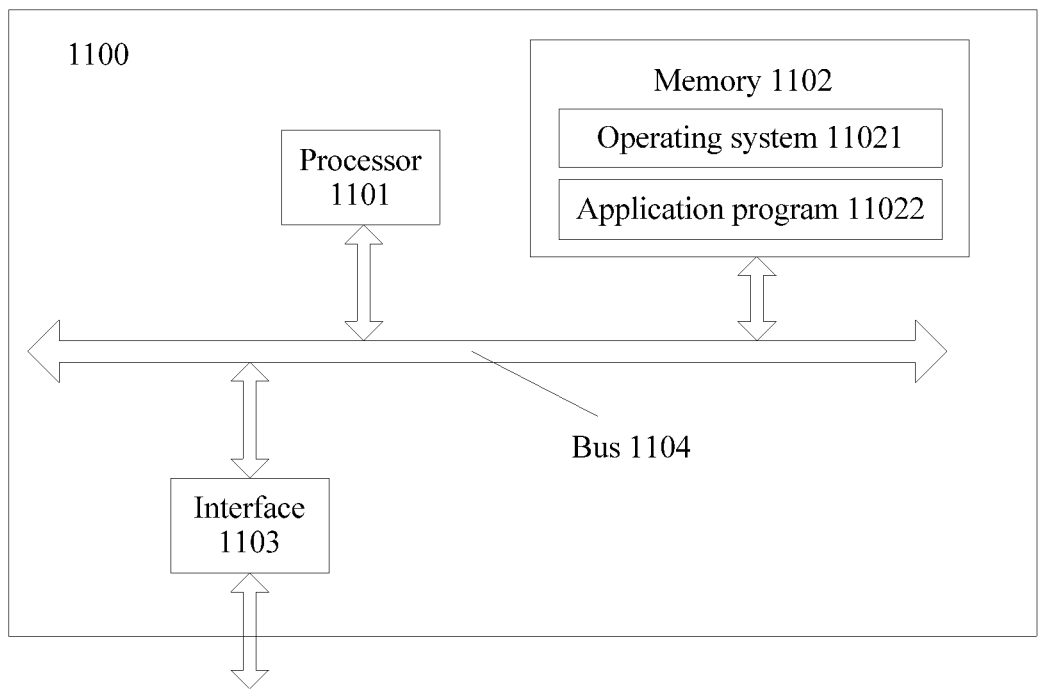
FIG. 7 is a schematic diagram of a hardware structure of a first network device according to an embodiment of this application.

FIG. 7 is a schematic diagram of a hardware structure of a first network device 1100 according to an embodiment of this application. The first network device 1100 shown in FIG. 7 may perform a corresponding step performed by the first network device in the method of the foregoing embodiment.

As shown in FIG. 7, the first network device 1100 includes a processor 1101, a memory 1102, an interface 1103, and a bus 1104. The interface 1103 may be implemented in a wireless or wired manner. Further, the interface 1103 may be a network adapter. The processor 1101, the memory 1102, and the interface 1103 are connected using the bus 1104.

The interface 1103 may further include a transmitter and a receiver, and is used by the first network device to receive information from and send information to the second network device in the foregoing embodiment. For example, the interface 1103 is configured to receive an LACPDU packet from and send an LACPDU packet to the second network device. The processor 1101 is configured to perform processing performed by the first network device in the foregoing embodiment. For example, the processor 1101 is configured to set a collecting and distributing state of the first aggregation port, determine whether the first aggregation port is in the collecting and distributing state, start or stop a timer, determine whether an LACPDU packet sent by the second network device is received, switch a state of a Mux machine, and/or perform another process in the technologies described in this specification. For example, the processor 1101 is configured to support processes S102, S104, and S106 in FIG. 3, or is configured to support processes S202, S204, and S206 in FIG. 5. The memory 1102 includes an operating system 11021 and an application program 11022, and is configured to store a program, code, or an instruction. When executing the program, the code, or the instruction, the processor 1101 or a hardware device may complete a processing process of the first network device in the foregoing method embodiments. Optionally, the memory 1102 may include a ROM and a RAM. The ROM includes a basic input/output system (BIOS) or an embedded system, and the RAM includes an application program and an operating system. When the first network device 1100 needs to run, the BIOS built into the ROM or a bootloader in the embedded system is used to boot the system to start, and boot the first network device 1100 to enter a normal running state. After entering the normal running state, the first network device 1100 runs the application program and the operating system in the RAM in order to complete the processing process of the first network device in the method embodiments.

It can be understood that FIG. 7 merely shows a simplified design of the first network device 1100. In actual application, the first network device may include any quantity of interfaces, processors, or memories. In addition, only the first network device is used as an example for description in this embodiment. It should be understood that the second network device or more network devices have a same function as the first network device, and details are not described herein.

Figure 8:
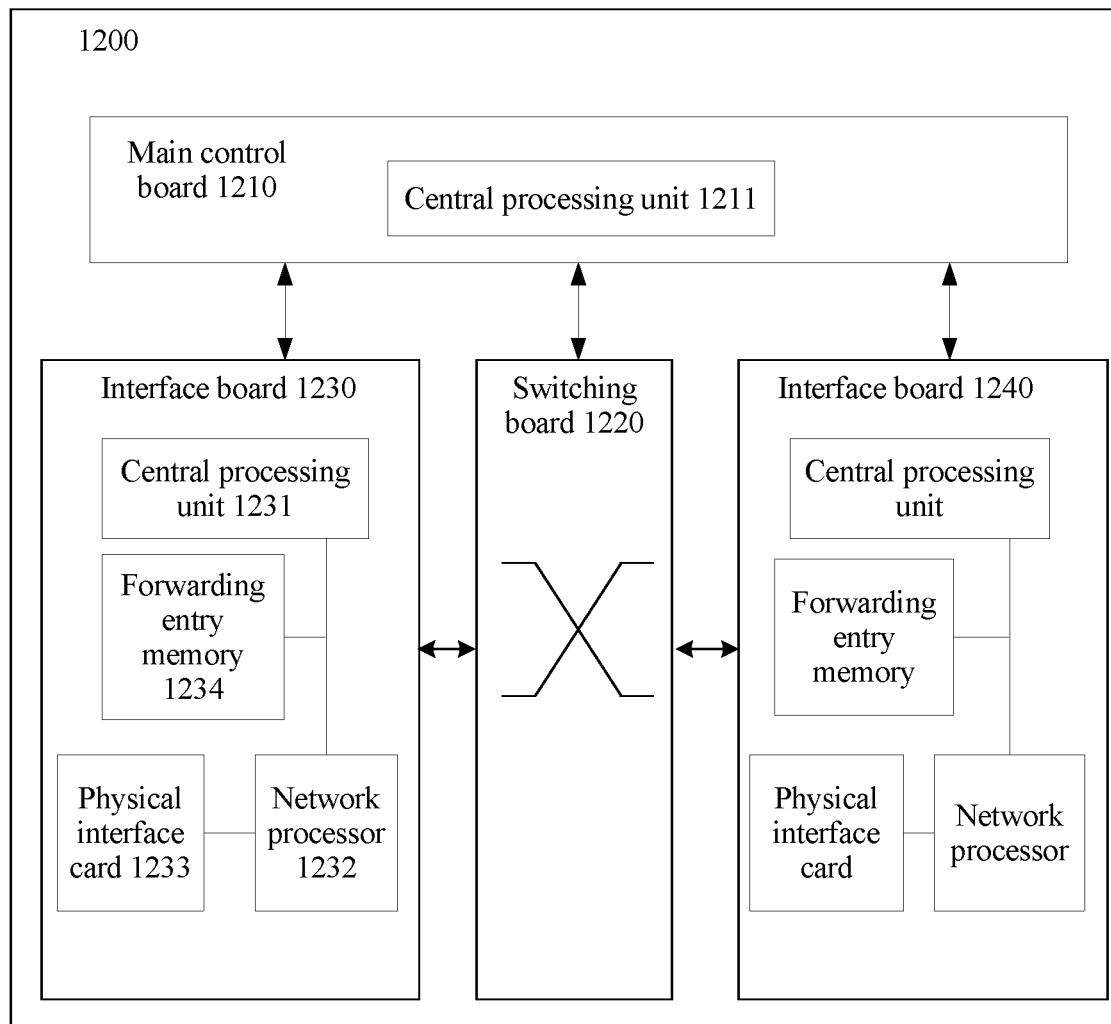
FIG. 8 is a schematic diagram of a hardware structure of another first network device according to an embodiment of this application.

FIG. 8 is a schematic diagram of a hardware structure of a first network device 1200 according to an embodiment of this application. The first network device 1200 shown in FIG. 8 may perform a corresponding step performed by the first network device in the method of the foregoing embodiment.

As shown in FIG. 8, the first network device 1200 includes a main control board 1210, an interface board 1230, a switching board 1220, and an interface board 1240. The main control board 1210 is configured to complete functions such as system management, device maintenance, and protocol processing. The switching board 1220 is configured to complete data exchange between interface boards (the interface board is also referred to as a line card or a service board). The interface board 1230 and the interface board 1240 are configured to provide various service interfaces (for example, a point of sale (POS) interface, a Gigabyte Ethernet (GE) interface, and an automatic teller machine (ATM) interface), and forward a data packet. The main control board 1210, the interface board 1230, the interface board 1240, and the switching board 1220 are connected to a platform backboard using a system bus for interworking. A central processing unit 1231 on the interface board 1230 is configured to control and manage the interface board, and communicate with a central processing unit on the main control board.

A physical interface card 1233 on the interface board 1230 receives an LACPDU packet from the second network device, and sends the LACPDU packet to the central processing unit 1211 on the main control board 1210 using the central processing unit 1231 on the interface board 1230. The central processing unit 1211 on the main control board 1210 is configured to obtain the LACPDU packet.

The central processing unit 1211 is further configured to set the first aggregation port to a collecting and distributing state when a Mux machine of the first aggregation port is in a COLLECTING_DISTRIBUTING state. The central processing unit 1211 is further configured to start a timer, and determine, before the timer expires, whether a first LACPDU packet from the second network device is received, where the first LACPDU packet is used to indicate that the second aggregation port is in the collecting and distributing state. If the central processing unit 1211 determines, when the timer expires, that the first LACPDU packet from the second network device is not received, the central processing unit 1211 switches the Mux machine from the COLLECTING_DISTRIBUTING state to an ATTACHED state.

The central processing unit 1211 is further configured to generate an LACPDU packet. The central processing unit 1211 sends the generated LACPDU packet to the physical interface card 1233 using the central processing unit 1231 on the interface board 1230. The physical interface card 1233 on the interface board 1230 sends the LACPDU packet to the second network device.

A forwarding entry memory 1234 on the interface board 1230 is configured to store a forwarding entry. The central processing unit 1231 on the interface board 1230 is configured to control a network processor 1232 to obtain the forwarding entry in the forwarding entry memory 1234. In addition, the central processing unit 1231 is configured to control the network processor 1232 to receive and send traffic using the physical interface card 1233.

It should be understood that an operation on the interface board 1240 is consistent with an operation on the interface board 1230 in this embodiment of the present application. For brevity, details are not described. It should be understood that the first network device 1200 in this embodiment may be corresponding to a function and/or step implemented in the foregoing method embodiments. For brevity, details are not described herein again. In addition, only the first network device is used as an example for description in this embodiment. It should be understood that the second network device or more network devices have a same function as the first network device, and details are not described herein.

In addition, it should be noted that there may be one or more main control boards. When there is a plurality of main control boards, a primary main control board and a secondary main control board may be included. There may be one or more interface boards, and the first network device with a stronger data processing capability may provide more interface boards. There may be one or more physical interface cards on the interface board. There may be no switching board, or there may be one or more switching boards. When there are a plurality of switching boards, load sharing and redundancy backup may be jointly implemented by the plurality of switching boards. In a centralized forwarding architecture, the first network device may not require the switching board, and the interface board implements a service data processing function in the entire system. In a distributed forwarding architecture, the first network device may include at least one switching board, and exchange data between a plurality of interface boards using the switching board, to provide a large-capacity data exchange and processing capability. Therefore, a data access and processing capability of the first network device in the distributed architecture is better than that of the device in the centralized architecture. Use of a specific architecture depends on a specific networking deployment scenario. This is not limited herein.

Figure 9:
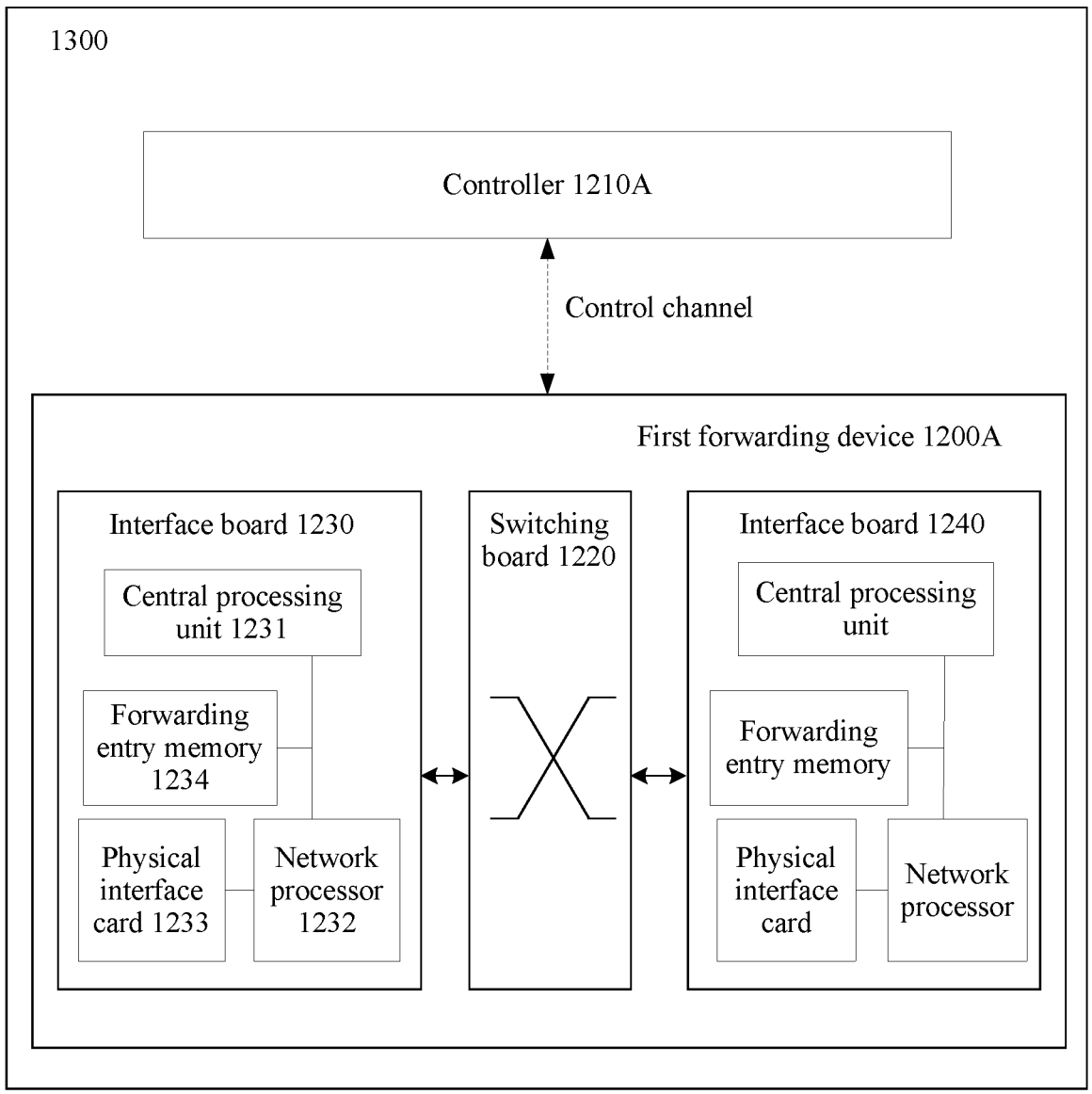
FIG. 9 is a schematic diagram of a hardware structure of a first network system according to an embodiment of this application.

FIG. 9 is a schematic diagram of a hardware structure of a first network system 1300 according to an embodiment of this application. The first network system 1300 shown in FIG. 9 may perform a corresponding step performed by the first network device in the method of the foregoing embodiment.

This product form of the first network system 1300 is applicable to a network architecture (for example, software-defined networking (SDN)) in which control and forwarding are separated. In the SDN, the main control board 1210 of the first network device 1200 shown in FIG. 8 is separated from the device, and forms a new independent physical device (namely, a controller 1210A shown in FIG. 9), and remaining components form another independent physical device (namely, a first forwarding device 1200A shown in FIG. 9). The controller 1210A interacts with the first forwarding device 1200A according to a control channel protocol. The control channel protocol may be the OPENFLOW protocol, the path computation element communication protocol (PCEP), the Border Gateway Protocol (BGP), the interface to the routing system (I2RS), or the like. That is, the first network system 1300 in this embodiment compared with the embodiment corresponding to FIG. 8 includes the separated controller 1210A and the first forwarding device 1200A.

The controller 1210A may be implemented based on a general-purpose physical server or a dedicated hardware structure. In a design example, the controller includes a receiver, a processor, a transmitter, a RAM, a ROM, and a bus (not shown in the figure). The processor is separately coupled to the receiver, the transmitter, the RAM, and the ROM using the bus. When the controller needs to run, a BIOS built into the ROM or a bootloader in an embedded system is used to boot the system to start, and boot the controller to enter a normal running state. After entering the normal running state, the controller runs an application program and an operating system in the RAM such that the processor performs all functions and steps of the main control board 1210 in FIG. 8.

The first forwarding device 1200A may be implemented based on a dedicated hardware structure. A function and a structure of the first forwarding device is consistent with functions and structures of the interface board 1230, the interface board 1240, and the switching board 1220 in FIG. 8 in order to perform corresponding functions and steps. Alternatively, the first forwarding device may be a virtual first forwarding device implemented based on the general-purpose physical server and a network functions virtualization (NFV) technology, and the virtual first forwarding device is a virtual router. In a scenario of the virtual first forwarding device, the interface board, the switching board, and the processor that are included in the foregoing physical first forwarding device in the embodiment of the first forwarding device can be considered as an interface resource, a network resource, and a processing resource that are allocated by the first forwarding device to the virtual first forwarding device using a general-purpose physical server in a virtual environment. For details of implementing a function or step of the first forwarding device using the general-purpose physical server, or for details of implementing a function or step of the first forwarding device using the general-purpose physical server and the NFV technology, refer to the embodiment in FIG. 7.

It should be understood that, in this embodiment, the controller 1210A and the first forwarding device 1200A in the first network system 1300 may implement various functions and steps implemented by the first network device in the method embodiments. For brevity, details are not described herein again. In addition, only the first network device is used as an example for description in this embodiment. It should be understood that the second network device or more network devices have a same function as the first network device, and details are not described herein.

In addition, an embodiment of this application further provides a computer storage medium configured to store a computer software instruction used by the foregoing first network device. The computer storage medium includes a program designed for executing the foregoing method embodiments.

As shown in FIG. 1, an embodiment of this application further includes a network system for implementing a Mux machine. The network system includes a first network device and a second network device, and the first network device and/or the second network device are the first network device in FIG. 6, FIG. 7, or FIG. 8. Alternatively, the first network device or the second network device or both are the first network system in FIG. 9.

Method or algorithm steps described in combination with the content disclosed in this application may be implemented by hardware, or may be implemented by a processor executing a software instruction. The software instruction may include a corresponding software module. The software module may be stored in a RAM, a flash memory, a ROM, an erasable programmable ROM (EPROM), an electrically EPROM (EEPROM), a register, a hard disk, a removable hard disk, a compact disc ROM (CD-ROM), or any other form of storage medium well-known in the art. For example, a storage medium is coupled to a processor such that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

The objectives, technical solutions, and beneficial effects of this application have been described in further detail with reference to the specific implementations. It should be understood that the foregoing descriptions are merely specific implementations of this application.

What is claimed is:

1. A method for implementing a multiplexor (mux) machine implemented by a first network device, wherein the method comprises:
    setting a first aggregation port of the first network device to a collecting and distributing state when the first network device determines that the mux machine of the first aggregation port is in the collecting and distributing state;
    starting a timer and determining, before the timer expires, whether a first Link Aggregation Control Protocol (LACP) data unit (LACPDU) packet from a second network device is received, wherein the first LACPDU packet indicates that a second aggregation port of the second network device is in the collecting and distributing state, and wherein the first aggregation port of the first network device is coupled to the second aggregation port of the second network device through an aggregated link in a network running LACP;
    switching the mux machine from the collecting and distributing state to an attached state when the first network device determines, when the timer expires, that the first LACPDU packet from the second network device is not received, wherein the collecting and distributing state comprises the mux machine being configured to send and receive packets using the first aggregation port of the first network device, and wherein the attached state comprises the mux machine being configured to attach the first aggregation port of the first network device to an aggregator associated with the mux machine and to not send and receive the packets using the first aggregation port of the first network device;
    determining, before the timer expires, that the first LACPDU packet from the second network device is received; and
    switching, by the first network device, a state of the mux machine from the collecting and distributing state to a double-port collecting and distributing state when the first LACPDU packet is received, wherein the double-port collecting and distributing state indicates that both the first aggregation port and the second aggregation port are in the collecting and distributing state.

2. The method of claim 1, wherein after switching the mux machine from the collecting and distributing state to the double-port collecting and distributing state, the method further comprises stopping the timer.

3. The method of claim 1, wherein the mux machine of the first aggregation port is in the attached state before being in the collecting and distributing state, and wherein the method further comprises:
    receiving a second LACPDU packet from the second network device;
    determining that the first aggregation port is in a selected state;
    determining, based on the second LACPDU packet, that the second aggregation port is in a synchronization state;
    determining, based on the second LACPDU packet, that the second aggregation port is not in the collecting and distributing state; and
    switching the mux machine from the attached state to the collecting and distributing state.

4. The method of claim 3, further comprising:
    determining that first information comprised in the second LACPDU packet matches second information of the first aggregation port stored in the first network device, wherein the first information comprises Partner_Port, Partner_Port_Priority, Partner_System, Partner_System_Priority, Partner_Key, and Partner_State.Aggregation, and wherein the second information comprises Actor_Port_Number, Actor_Port_Priority, Actor_System, Actor_System_Priority, Actor_Oper_Port_Key, and Actor_Oper_Port_State.Aggregation; and
    determining that Actor_State.Synchronization comprised in the second LACPDU packet indicates the synchronization state.

5. The method of claim 3, further comprising:
    determining, based on the second LACPDU packet, that the second aggregation port is in the synchronization state;
    determining, based on the second LACPDU packet, that the second aggregation port is in the collecting and distributing state;
    switching the mux machine from the attached state to the double-port collecting and distributing state; and
    setting the first aggregation port to the collecting and distributing state.

6. The method of claim 1, further comprising:
    receiving a third LACPDU packet from the second network device, wherein the third LACPDU packet indicates that the second aggregation port is not in the collecting and distributing state;
    determining, based on the third LACPDU packet, that the second aggregation port is not in the collecting and distributing state; and
    switching the mux machine from the double-port collecting and distributing state to the collecting and distributing state.

7. The method of claim 1, further comprising switching the mux machine from the double-port collecting and distributing state to the attached state when the first network device determines that the first aggregation port is in an unselected state, when the first network device determines that the first aggregation port is in a standby state, or when the first network device receives a fourth LACPDU packet from the second network device and determines, based on the fourth LACPDU packet, that the second aggregation port is not in a synchronization state.

8. The method of claim 1, further comprising setting the aggregated link to single-port up when the mux machine is in the collecting and distributing state and the timer expires, wherein single-port up indicates that the first aggregation port at one end of the aggregated link is in the collecting and distributing state, and wherein the second aggregation port at another end is not in the collecting and distributing state.

9. The method of claim 1, wherein a duration of the timer is greater than or equal to 3 seconds (s) and less than or equal to 90 s.

10. A first network device running a Link Aggregation Control Protocol (LACP), comprising:
  a first aggregation port coupled to a second aggregation port of a second network device over an aggregated link;
  a non-transitory memory configured to store instructions; and
  a processor coupled to the non-transitory memory, wherein the instructions, when executed by the processor, cause the first network device to:
    set the first aggregation port to a collecting and distributing state when a multiplexor (mux) machine of the first aggregation port is in the collecting and distributing state;
    start a timer;
    determine, before the timer expires, whether a first LACP data unit (LACPDU) packet from the second network device is received, wherein the first LACPDU packet indicates that the second aggregation port is in the collecting and distributing state;
    determine, when the timer expires, that the first LACPDU packet from the second network device is not received;
    switch the mux machine from the collecting and distributing state to an attached state when the first LACPDU packet from the second network device is not received, wherein the collecting and distributing state comprises the mux machine being configured to send and receive packets using the first aggregation port of the first network device, and wherein the attached state comprises the mux machine being configured to attach the first aggregation port of the first network device to an aggregator associated with the mux machine and to not send and receive the packets using the first aggregation port of the first network device;
    determine, before the timer expires, that the first LACPDU packet from the second network device is received; and
    switch a state of the mux machine from the collecting and distributing state to a double-port collecting and distributing state when the first LACPDU packet is received, wherein the double-port collecting and distributing state indicates that both the first aggregation port and the second aggregation port are in the collecting and distributing state.

11. The first network device of claim 10, wherein the instructions, when executed by the processor, further cause the first network device to stop the timer after the processor switches the mux machine from the collecting and distributing state to the double-port collecting and distributing state.

12. The first network device of claim 10, wherein the mux machine of the first aggregation port is in the attached state before being in the collecting and distributing state, and wherein the instructions, when executed by the processor, further cause the first network device to:
  receive a second LACPDU packet from the second network device;
  determine that the first aggregation port is in a selected state;
  determine, based on the second LACPDU packet, that the second aggregation port is in a synchronization state;
  determine, based on the second LACPDU packet, that the second aggregation port is not in the collecting and distributing state; and
  switch the mux machine from the attached state to the collecting and distributing state.

13. The first network device of claim 12, wherein the instructions, when executed by the processor, further cause the first network device to:
  determine that first information comprised in the second LACPDU packet matches second information of the first aggregation port stored in the first network device, wherein the first information comprises Partner_Port, Partner_Port_Priority, Partner_System, Partner_System_Priority, Partner_Key, and Partner_State.Aggregation, and wherein the second information comprises Actor_Port_Number, Actor_Port_Priority, Actor_System, Actor_System_Priority, Actor_Oper_Port_Key, and Actor_Oper_Port_State.Aggregation; and
  determine that Actor_State.Synchronization comprised in the second LACPDU packet indicates the synchronization state.

14. The first network device of claim 12, wherein the instructions, when executed by the processor, further cause the first network device to:
  determine, based on the second LACPDU packet, that the second aggregation port is in the synchronization state;
  determine, based on the second LACPDU packet, that the second aggregation port is in the collecting and distributing state;
  switch the mux machine from the attached state to the double-port collecting and distributing state; and
  set the first aggregation port to the collecting and distributing state.

15. The first network device of claim 10, wherein the instructions, when executed by the processor, further cause the first network device to:
  receive a third LACPDU packet from the second network device, wherein the third LACPDU packet indicates that the second aggregation port is not in the collecting and distributing state;
  determine, based on the third LACPDU packet, that the second aggregation port is not in the collecting and distributing state; and
  switch the mux machine from the double-port collecting and distributing state to the collecting and distributing state.

16. The first network device of claim 10, wherein the instructions, when executed by the processor, further cause the first network device to be configured to switch the mux machine from the double-port collecting and distributing state to the attached state when the first network device determines that the first aggregation port is in an unselected state, when the first network device determines that the first aggregation port is in a standby state, or when the first network device determines, based on a fourth LACPDU packet received from the second network device, that the second aggregation port is not in a synchronization state.

17. The first network device of claim 10, wherein the instructions, when executed by the processor, further cause the first network device to set the aggregated link to single-port up when the mux machine is in the collecting and distributing state and the timer expires, wherein single-port up indicates that the first aggregation port at one end of the aggregated link is in the collecting and distributing state, and wherein the second aggregation port at another end is not in the collecting and distributing state.

18. The first network device of claim 10, wherein duration of the timer is greater than or equal to 3 seconds (s) and less than or equal to 90 s.

19. A computer program product comprising computer-executable instructions stored on a non-transitory computer-readable medium that, when executed by a processor, cause a first network device to:

set a first aggregation port of the first network device to a collecting and distributing state when the first network device determines that a multiplexor (mux) machine of the first aggregation port is in the collecting and distributing state;

start a timer and determine, before the timer expires, whether a first Link Aggregation Control Protocol (LACP) data unit (LACPDU) packet from a second network device is received, wherein the first LACPDU packet indicates that a second aggregation port of the second network device is in the collecting and distributing state, and wherein the first aggregation port of the first network device is coupled to the second aggregation port of the second network device through an aggregated link in a network running LACP;

switch the mux machine from the collecting and distributing state to an attached state when the first network device determines, when the timer expires, that the first LACPDU packet from the second network device is not received, wherein the collecting and distributing state comprises the mux machine being configured to send and receive packets using the first aggregation port of the first network device, and wherein the attached state comprises the mux machine being configured to attach the first aggregation port of the first network device to an aggregator associated with the mux machine and to not send and receive the packets using the first aggregation port of the first network device;

determine, before the timer expires, that the first LACPDU packet from the second network device is received; and switch, by the first network device, a state of the mux machine from the collecting and distributing state to a double-port collecting and distributing state when the first LACPDU packet is received, wherein the double-port collecting and distributing state indicates that both the first aggregation port and the second aggregation port are in the collecting and distributing state.

20. The computer program product of claim 19, wherein the instructions further cause the processor to cause the first network device to stop the time after switching the mux machine from the collecting and distributing state to the double-port collecting and distributing state.

* * * * *

UNITED STATES PATENT AND TRADEMARK OFFICE
CERTIFICATE OF CORRECTION

| | | |
|---|---|---|
| PATENT NO. | : 11,398,976 B2 | |
| APPLICATION NO. | : 16/727246 | |
| DATED | : July 26, 2022 | |
| INVENTOR(S) | : Bo Song et al. | |

It is certified that error appears in the above-identified patent and that said Letters Patent is hereby corrected as shown below:

On the Title Page

Page 2, item (56) References Cited, U.S. Patent Documents: "2017/0063627 A1 3/2017 Ch" should read "2017/0063627 A1 3/2017 Chhabra"

Signed and Sealed this
Eighteenth Day of October, 2022

Katherine Kelly Vidal
*Director of the United States Patent and Trademark Office*